(12) United States Patent
Akutsu

(10) Patent No.: US 11,630,032 B2
(45) Date of Patent: Apr. 18, 2023

(54) VEHICLE INSPECTION WHEEL SUPPORT VIBRATING DEVICE

(71) Applicant: HONDA MOTOR CO., LTD., Tokyo (JP)

(72) Inventor: Susumu Akutsu, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 171 days.

(21) Appl. No.: 17/144,849

(22) Filed: Jan. 8, 2021

(65) Prior Publication Data

US 2021/0215574 A1  Jul. 15, 2021

(30) Foreign Application Priority Data

Jan. 15, 2020 (JP) .............................. JP2020-004241

(51) Int. Cl.
*G01M 17/007* (2006.01)
*G01M 7/02* (2006.01)

(52) U.S. Cl.
CPC .......... *G01M 17/0074* (2013.01); *G01M 7/02* (2013.01)

(58) Field of Classification Search
CPC ..... G01M 17/0074; G01M 7/02; G01M 7/027
See application file for complete search history.

(56) References Cited

U.S. PATENT DOCUMENTS

2010/0058851 A1\* 3/2010 Lawrence ............... G01L 5/282
73/123

FOREIGN PATENT DOCUMENTS

JP       2007-147394        6/2007
JP       2007327863 A    \* 12/2007

OTHER PUBLICATIONS

Engineeers Academy, https://www.youtube.com/watch?v=H9_Llzcz2cY, Feb. 7, 2019 (Year: 2019).\*

\* cited by examiner

*Primary Examiner* — Eric S. McCall
*Assistant Examiner* — Timothy P Graves
(74) *Attorney, Agent, or Firm* — Rankin, Hill & Clark LLP

(57) ABSTRACT

A vibrating device is provided that can appropriately reproduce a vibrating state during travel of a vehicle. A vibrating actuator (12) of a vibrating device (1) vibrates a driving wheel W by driving a second roller (16) in a front-rear direction in a state where a lower side portion of the driving wheel W is held between a first roller (17) and the second roller (16). In a case where the wheel W is in a creep state, the second roller (16) is driven so as to rotate in a reverse direction to the driving wheel W by a rotating actuator (170).

3 Claims, 18 Drawing Sheets

VEHICLE INSPECTION WHEEL SUPPORT VIBRATING DEVICE

BACKGROUND OF THE INVENTION

Field of the Invention

The present invention relates to a vibrating device that vibrates a wheel of a vehicle as a vibrating target.

Description of the Related Art

In related art, a vibrating device has been known which is disclosed in Japanese Patent Laid-Open No. 2007-147394. This vibrating device is applied to a vehicle inspection device conducting a durability test of a four-wheeled vehicle and includes four vibrators in total for left and right front wheels and left and right rear wheels. Each of the vibrators vibrates the corresponding wheel and includes an up-down actuator generating vibration in an up-down direction, a placement board vibrated by the up-down actuator, a front-rear actuator generating vibration in a front-rear direction, and a vibration plate driven by this front-rear actuator.

In this vibrating device, in a case where each of the wheels is placed on the placement board, the vibration plate of the vibrator for the front wheel abuts the front wheel from a front side in an obliquely inclined posture, and the vibration plate of the vibrator for the rear wheel abuts the rear wheel from a rear side in an obliquely inclined posture. Then, vibration from the up-down actuator and the front-rear actuator is input to each of the wheels.

A vibrating device disclosed in above Japanese Patent Laid-Open No. 2007-147394 has a problem that because one vibration plate abuts one wheel from a front side or a rear side in an inclined posture and vibrates the wheel, during a vibrating operation, it is difficult to retain a state where the vibration plate and the wheel appropriately abut each other. As a result, it is anticipated that a vibrating state during travel of a vehicle will not be able to be reproduced appropriately. In general, in a state where motive power is transmitted to a driving wheel during travel of the vehicle, the driving wheel rotates in only one direction around a rotation axis line thereof. However, the vibrating device disclosed in above Japanese Patent Laid-Open No. 2007-1.47394 has a problem that because one vibration plate abuts one wheel from the front side or the rear side in the inclined posture and vibrates the wheel, the vibration plate becomes a factor of hindering rotation of the driving wheel under a condition in which the driving wheel rotates in one direction, and a vibrating state during travel of the vehicle may not appropriately be reproduced.

The present invention has been made to solve the above problem, and an object is to provide a vibrating device that can appropriately reproduce a vibrating state during travel of a vehicle.

SUMMARY OF THE INVENTION

To achieve the above object, a first aspect of the invention provides a vibrating device vibrating a wheel of a vehicle as a vibrating target, the vibrating device including: a first roller which abuts the wheel from one side of the wheel of the vehicle in a front-rear direction, is arranged to regulate movement of the wheel to the one side in the front-rear direction, and is rotatable around an axis line along a rotation axis of the wheel; a second roller which is arranged to be capable of moving in the front-rear direction of the wheel, abuts the wheel from another side of the wheel in the front-rear direction, is capable of holding a lower side portion of the wheel between the second roller and the first roller, and is rotatable around an axis line along the rotation axis of the wheel; a vibrating actuator which vibrates the wheel via the second roller by driving the second roller in the front-rear direction of the wheel; and a rotating actuator which is capable of driving the second roller in a predetermined rotation direction.

In this vibrating device, the first roller abuts the wheel front one side of the wheel of the vehicle in the front-rear direction, and the movement of the wheel to the one side in the front-rear direction is thereby regulated. The second roller abuts the wheel from the other side of the wheel in the front-rear direction, and the lower side portion of the wheel is thereby held between the second roller and the first roller. The second roller is driven by the vibrating actuator in the front-rear direction of the wheel in this state, and the wheel is thereby vibrated via the second roller. During a vibrating operation, the wheel is vibrated by the second roller in a state where the lower side portion of the wheel is held between the first roller and the second roller.

In this case, for example, in a case where the wheel is a driving wheel and motive power is transmitted, the second roller is driven such that the predetermined rotation direction becomes the reverse direction to a rotation direction of the driving wheel, and a vibrating force of the second roller can thereby efficiently be transmitted to the driving wheel while the second roller is inhibited from becoming rotational resistance to the driving wheel. Meanwhile, in a case where the wheel is an idler wheel, the second roller is not driven by the rotating actuator, and the second roller and the first roller thereby rotate in accordance with free rotation of the idler wheel. Accordingly, the second roller can be inhibited from becoming rotational resistance to the idler wheel.

As described above, in a case where the wheel is either one of the idler wheel and the driving wheel, a vibration state in a case where the wheel travels over a protrusion on a road surface during travel of the vehicle can appropriately be reproduced ("wheel" in this specification is not limited to a wheel but means a configuration including both of a wheel and a tire in a case of a wheel with a tire, and a tire in this case is not limited to a pneumatic tire but may include an airless tire; "vibrating a wheel of a vehicle as a vibrating target" corresponds to vibrating a vehicle via a wheel; and "an axis line along a rotation axis of a wheel" is not limited to an axis line in parallel with a rotation axis of a wheel but may include an axis line inclined at a predetermined angle (for example, ±several degrees) with respect to the rotation axis).

A second aspect of the invention provides the vibrating device according to the first aspect, in which the wheel is a driving wheel of the vehicle and the rotating actuator drives the second roller such that the predetermined rotation direction of the second roller becomes a reverse direction to a rotation direction of the driving wheel when the second roller is driven in the front-rear direction by the vibrating actuator and motive power is transmitted to the driving wheel.

In the vibrating device, the second roller is driven by the rotating actuator such that the predetermined rotation direction of the second roller becomes the reverse direction to the rotation direction of the driving wheel when the second roller is driven in the front-rear direction by the vibrating actuator and the motive power is transmitted to the driving wheel. Consequently, even under a condition in which the motive power is transmitted to the driving wheel, the vibrating force of the second roller can efficiently be transmitted to the driving wheel while the second roller is inhibited from becoming the rotational resistance to the driving wheel. As a result, the vibration state in a case where the driving wheel travels over a protrusion on a road surface during travel of the vehicle can appropriately be reproduced.

A third aspect of the invention provides the vibrating device according to the second aspect, in which the rotating actuator drives the second roller such that a rotation speed ratio between the driving wheel and the second roller becomes a value within a predetermined range including a reciprocal value of a radius ratio between the driving wheel and the second roller when the second roller is driven in the front-rear direction by the vibrating actuator and the motive power is transmitted to the driving wheel.

In the vibrating device, the second roller is driven by the rotating actuator such that the predetermined rotation direction of the second roller agrees with the rotation direction of the driving wheel and at the same time the rotation speed ratio between the driving wheel and the second roller becomes a value within the predetermined range including the reciprocal value of the radius ratio between the driving wheel and the second roller when the second roller is driven in the front-rear direction by the vibrating actuator and the motive power is transmitted to the driving wheel. Consequently, even under a condition in which the motive power is transmitted to the driving wheel, the vibrating force of the second roller can efficiently be transmitted to the driving wheel while the second roller is inhibited from becoming the rotational resistance to the driving wheel as much as possible. As a result, the vibration state in a case where the driving wheel travels over a protrusion on a road surface during travel of the vehicle can more appropriately be reproduced.

DETAILED DESCRIPTION OF THE PREFERRED EMBODIMENTS

Figure 1:
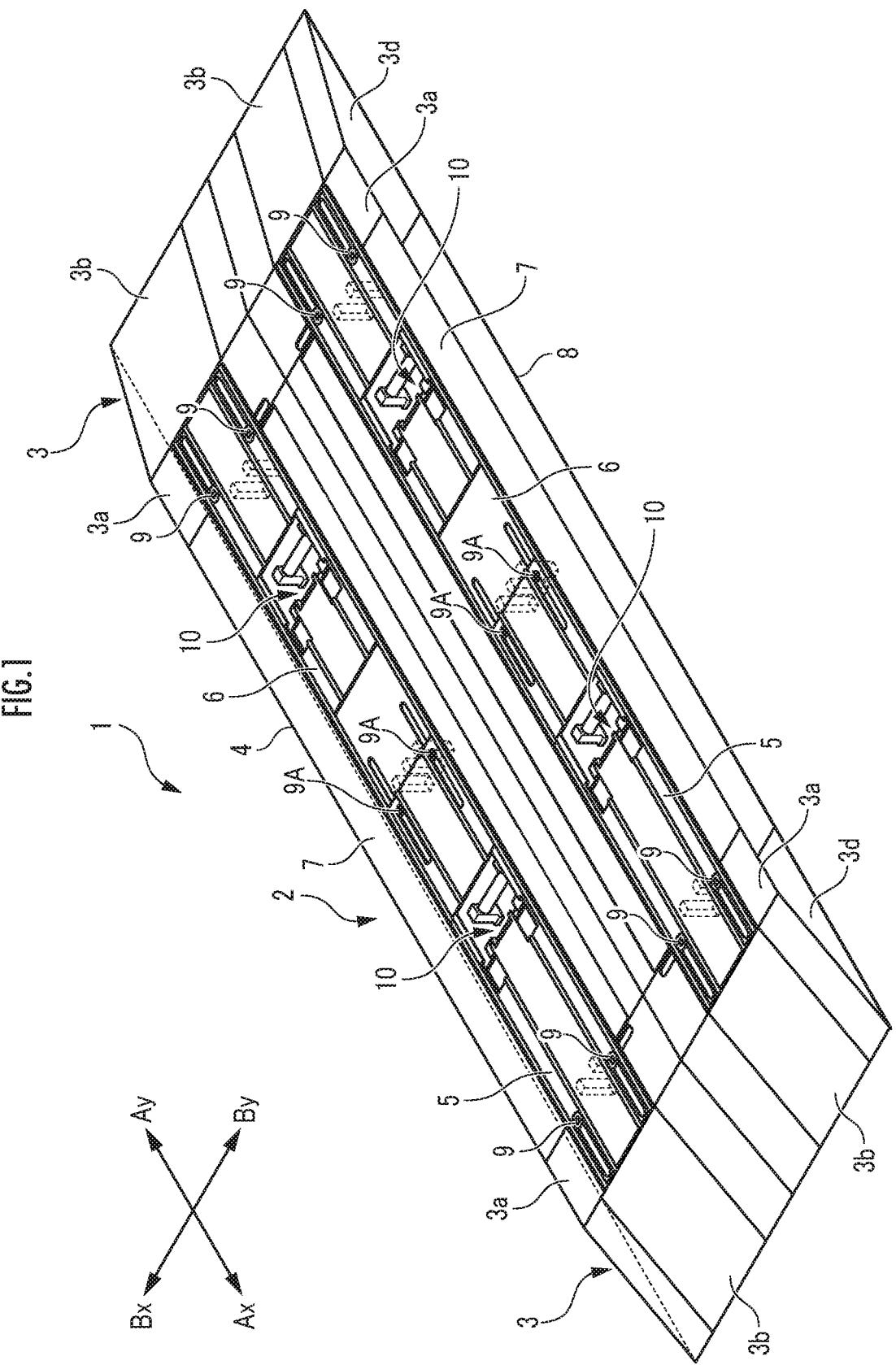
FIG. 1 is a perspective view illustrating an external appearance of a vibrating device according to a first embodiment of the present invention.

A vibrating device according to a first embodiment of the present invention will hereinafter be described with reference to drawings. A vibrating device 1 of this embodiment, which is illustrated in FIG. 1, is applied to a vehicle inspection device for inspecting a vehicle V (see FIG. 16), and this vibrating device 1 is provided with four vibrators 10.

As described later, in this vibrating device 1, four wheels W (see FIGS. 8 and 16) in the vehicle V as an inspection target are respectively vibrated by the four vibrators 10, and whether or not abnormal noise or the like occurs in the vehicle V is inspected. In the following description, for convenience, an Ax side of arrows Ax-Ay ire FIG. 1 will be referred to as "front", an Ay side will be referred to as "rear", a Bx side of arrows Bx-By will be referred to as "right", a By side will be referred to as "left", an upper side will be referred to as "up", and a lower side will be referred to as "down".

Figure 2:
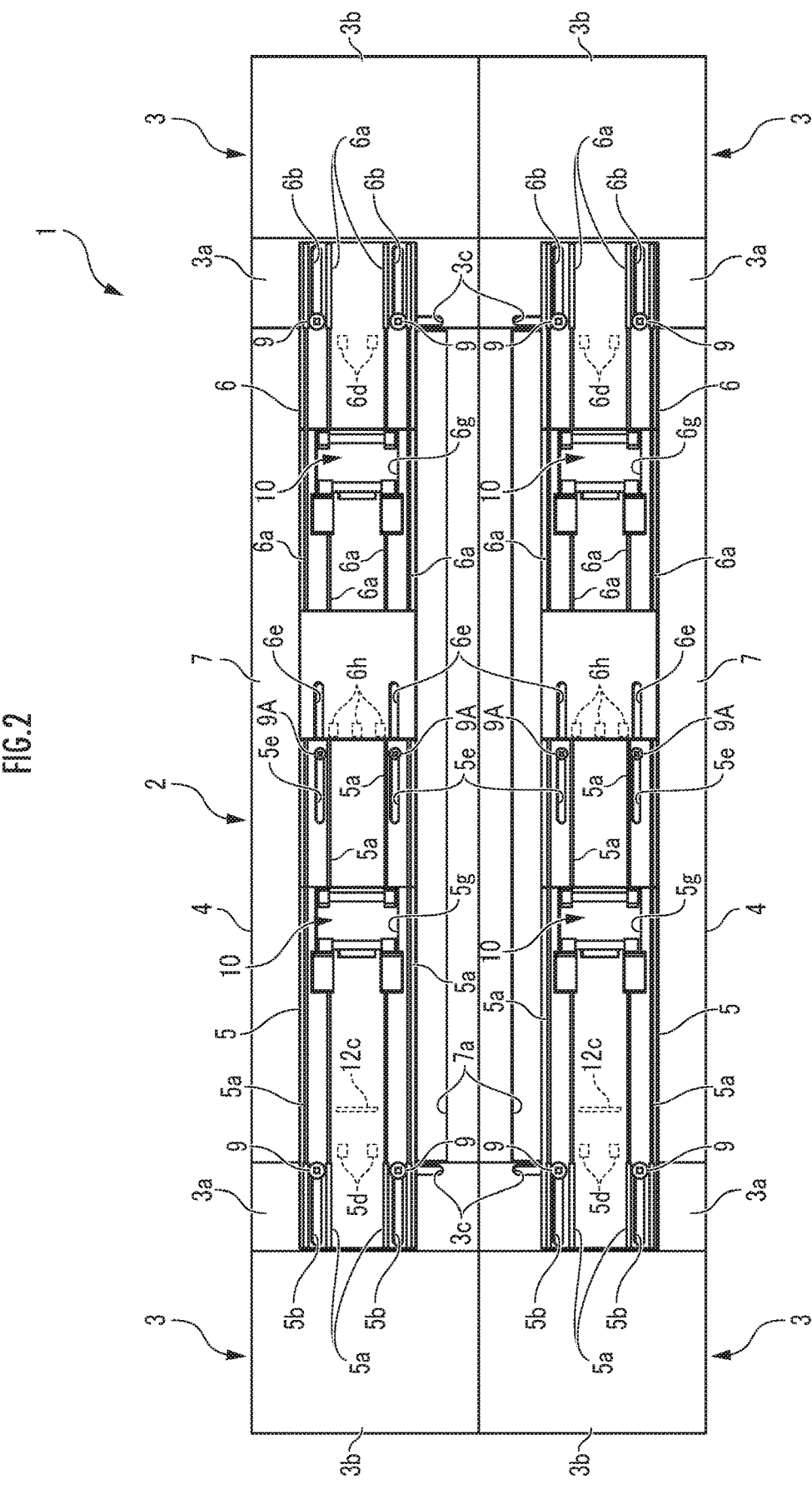
FIG. 2 is a plan view illustrating a state where tread-corresponding intervals and wheelbase-corresponding intervals among four vibrators are set to maximum values.
Figure 3:
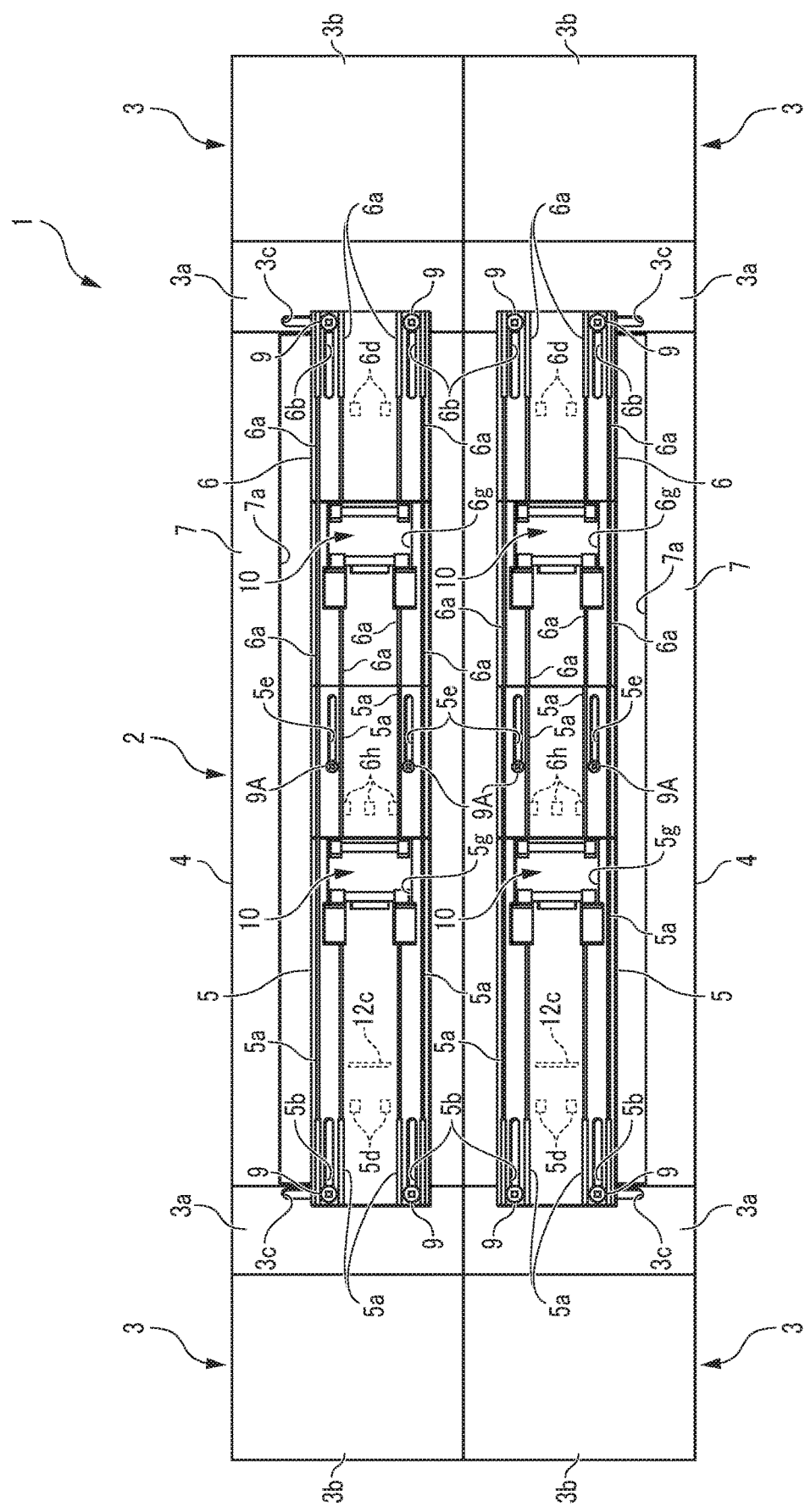
FIG. 3 is a plan view illustrating a state where the tread-corresponding intervals and the wheelbase-corresponding intervals among the four vibrators are set to minimum values.

The vibrating device 1 includes a placement board 2 for placing the vehicle V in an inspection. This placement board 2 is installed on a floor F (see FIG. 8) and is positioned below a part at the lowest ground height of the vehicle V in the inspection. As illustrated in FIGS. 1 to 3, because a left half portion and a right half portion of this placement board 2 are configured to be in plane symmetry, and the left half portion will described as an example in the following.

The left half portion of the placement board 2 includes a placement portion 4 being in a rectangular shape in a planar view and extending in a front-rear direction and front and rear slope portions 3 and 3 provided in front and rear portions of this placement portion 4. A surface of the front slope portion 3 is formed with a flat surface portion 3a continuous with a front end of the placement portion 4 and an inclined surface 3b being continuous with this flat surface portion 3a and extending obliquely forward and downward.

A long hole 3c is formed in this flat surface portion 3a. This long hole 3c has a predetermined width in the front-rear direction and extends in a left-right direction with a predetermined length in a state where a predetermined interval is provided from an edge portion of an opening 7a of a top plate portion 7, the opening 7a being described later, and both ends of the long hole 3c are formed into semicircular shapes.

Multiple support pillars are provided (not illustrated) in an internal portion of the front slope portion 3. Upper end portions of those support pillars are fixed to the flat surface portion 3a and the inclined surface 3h, and lower end portions are fixed to a bottom surface portion 3d of the slope portion 3. Accordingly, those support pillars support the front slope portion 3 against a force exerted on the front slope portion 3 from above.

A surface of the rear slope portion 3 is formed with the flat surface portion 3a continuous with a rear end of the placement portion 4 and the inclined surface 3b being continuous with this flat surface portion 3a and extending obliquely rearward and downward. The long hole 3c is also formed in this flat surface portion 3a, and this long hole 3c is similarly configured to the long hole 3c of the front slope portion 3. Multiple support pillars similar to the front slope portion 3 are provided (not illustrated) in an internal portion of the rear slope portion 3.

The surface of the rear slope portion 3 is formed as an inclined surface being continuous with the rear end of the placement portion 4 and extending obliquely rearward and downward. The vehicle V moves from a floor surface onto the placement portions 4 via the rear slope portions 3 when the inspection is started and moves from the placement portions 4 to the floor surface via the front slope portions 3 after the inspection is finished.

Meanwhile, in order from an upper side to a lower side, the placement portion 4 includes front and rear placement plate portions 5 and 6, the top plate portion 7, a base plate portion 8, and so forth.

The base plate portion 8 is in a flat-plate shape being in a rectangular shape in a planar view and extending in the front-rear direction, and front and rear end portions of the base plate portion 8 are integrally fixed to the front and rear slope portions 3 and 3. The base plate portion 8 is placed on the floor surface and is tightly fixed to the floor F via fixing tools not illustrated (for example, anchor bolts).

The top plate portion 7 is in a rectangular shape in a planar view and extends in the front-rear direction and is arranged in parallel e base plate portion 8. The opening 7a is provided to the top plate portion 7. This opening 7a is arranged in a central portion of the top plate portion 7, is formed into a laterally long rectangular shape in a planar view, and passes through the top plate portion 7 in the up-down direction.

The front placement plate portion 5 is in a laterally long rectangular shape in a planar view and extends in the front-rear direction, and four ribs 5a are provided to a surface of the front placement plate portion 5. Those four ribs 5a extend in the front-rear direction, and the two inner-side ribs 5a and 5a have functions of defining a traveling road and of guiding the wheel W of the vehicle V. Accordingly, when the vehicle V travels up onto the placement board 2 and moves to an inspection position (see FIG. 16) in the inspection, the wheels W are guided by the front placement plate portions 5.

A front end portion of the front placement plate portion 5 is placed on the flat surface portion 3a of the front slope portion 3, and a pair of long holes 5b and 5b are formed between the two ribs 5a and 5a at both of left and right ends of the front end portion. Those long holes 5b and 5b extend in the front-rear direction in parallel with each other. The font end portion of the front placement plate portion 5 is fixed to the front slope portion 3 in edge portions of those long holes 5b and 5b via a hydraulic clamp device 9.

Figure 4:
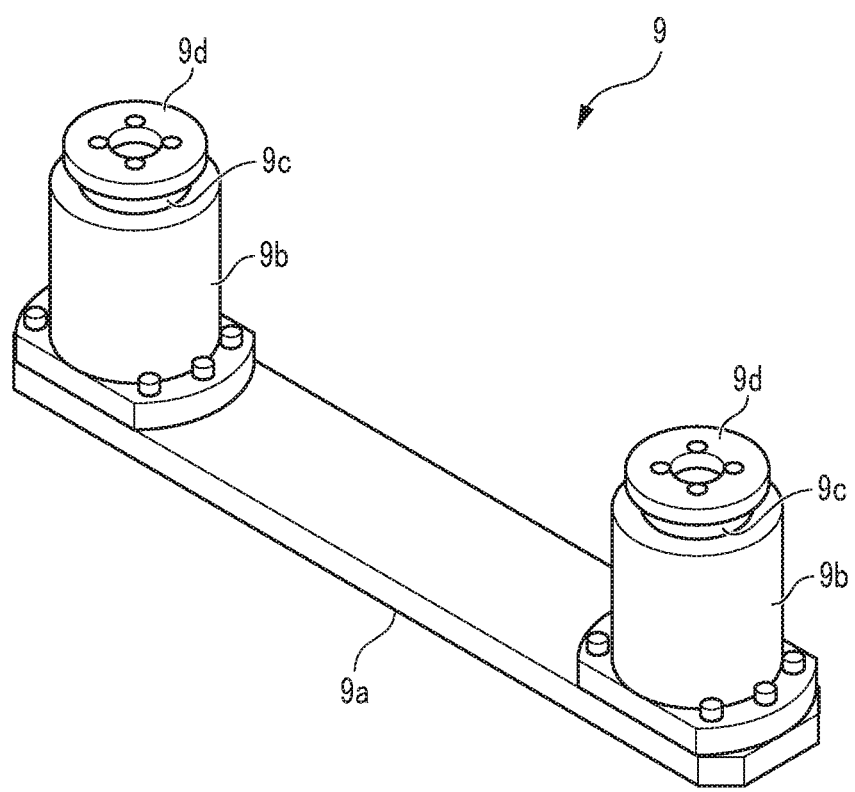
FIG. 4 is a perspective view illustrating a configuration of a hydraulic clamp device.

As illustrated in FIG. 4, the hydraulic clamp device 9 includes a coupling plate 9a and two hydraulic cylinders 9b and 9b, and the hydraulic cylinders 9b and 9b are fastened, by screws, to an upper surface of the coupling plate 9a.

A piston rod 9c is provided to each of the hydraulic cylinders 9b, and a flange 9d is integrally provided to an upper end portion of the piston rod 9c. In this hydraulic clamp device 9, a supplied hydraulic pressure from a hydraulic circuit (not illustrated) to the hydraulic cylinder 9b is controlled by a control device not illustrated, and the piston rod 9c thereby extends and contracts in the up-down direction with respect to the hydraulic cylinder 9b.

In a case of this hydraulic clamp device 9, in a state where the piston rods 9c are respectively fitted in the long holes 5b of the front placement plate portion 5 and in the above-described long holes 3c of the front slope portion 3, the front placement plate portion 5 and the flat surface portion 3a of the front slope portion 3 are held between lower surfaces of the flanges 9d and upper end surfaces of the hydraulic cylinders 9b. Accordingly, the front placement plate portion 5 is fixed to the front slope portion 3.

The piston rods 9c extend relatively upward from the hydraulic cylinders 9b in this state, and fixing of the front placement plate portion 5 to the front slope portion 3 is thereby released. In a state where the fixing of the front placement plate portion 5 to the front slope portion 3 is released as described above, the piston rods 9c become capable of moving in the left-right direction while being guided by the long holes 3c of the front slope portion 3, and the front placement plate portion 5 thereby becomes capable of moving in the left-right direction by the length of the long hole 3c. Specifically, the front placement plate portion 5 is configured to be capable of moving in the left-right direction between a maximum width position illustrated in FIG. 2 and a minimum width position illustrated in FIG. 3.

A rear end portion of the front placement plate portion 5 is placed on an upper surface of a front end portion of the rear placement plate portion 6, and a pair of long holes 5e and 5e are formed in both of left and right ends of the rear end portion. The long holes 5c and 5c have the same lengths in the front-rear direction as the respective long holes 5b and 5b, and center lines, of the respective long holes 5e, extending in the front-rear direction are arranged on the same straight lines as center lines of the respective long holes 5h.

A piston rod (not illustrated) of a hydraulic clamp device 9A is fitted in each of the long holes 5e, and this piston rod is also fitted in a long hole 6e of the rear placement plate portion 6, which will be described later. This hydraulic clamp device 9A is configured similarly to the above-described hydraulic clamp device 9 except a slightly small size thereof compared to the above-described hydraulic clamp device 9, and a description thereof will not be made.

In the above configuration, in a state where fixing by the hydraulic clamp devices 9 and 9A is released, in the front placement plate portion 5, the edge portion of the long hole 5b and an edge portion of the long hole 5e become capable of moving respectively along the piston rod 9c of the hydraulic clamp device 9 and the piston rod of the hydraulic clamp device 9A.

Accordingly, the front placement plate portion 5 is capable of moving in the front-rear direction relatively with respect to the front slope portion 3 only by the lengths of the long holes 5b and 5e in the front-rear direction. Specifically, the front placement plate portion 5 is configured to be capable of moving in the front-rear direction between a maximum length position illustrated in FIG. 2 and a minimum length position illustrated in FIG. 3.

Figure 5:
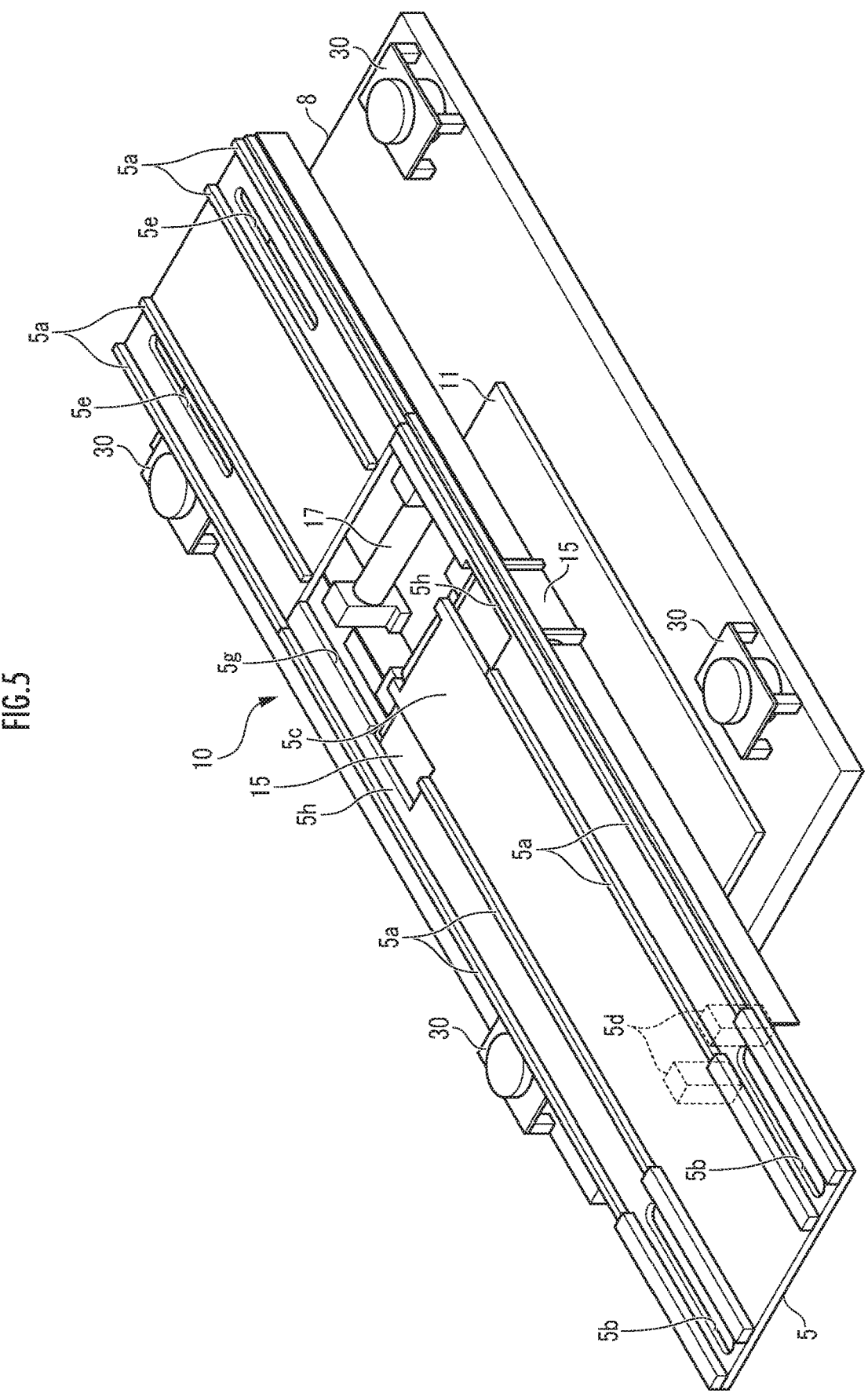
FIG. 5 is a perspective view illustrating configurations of a front placement plate portion and the vibrator.
Figure 6:
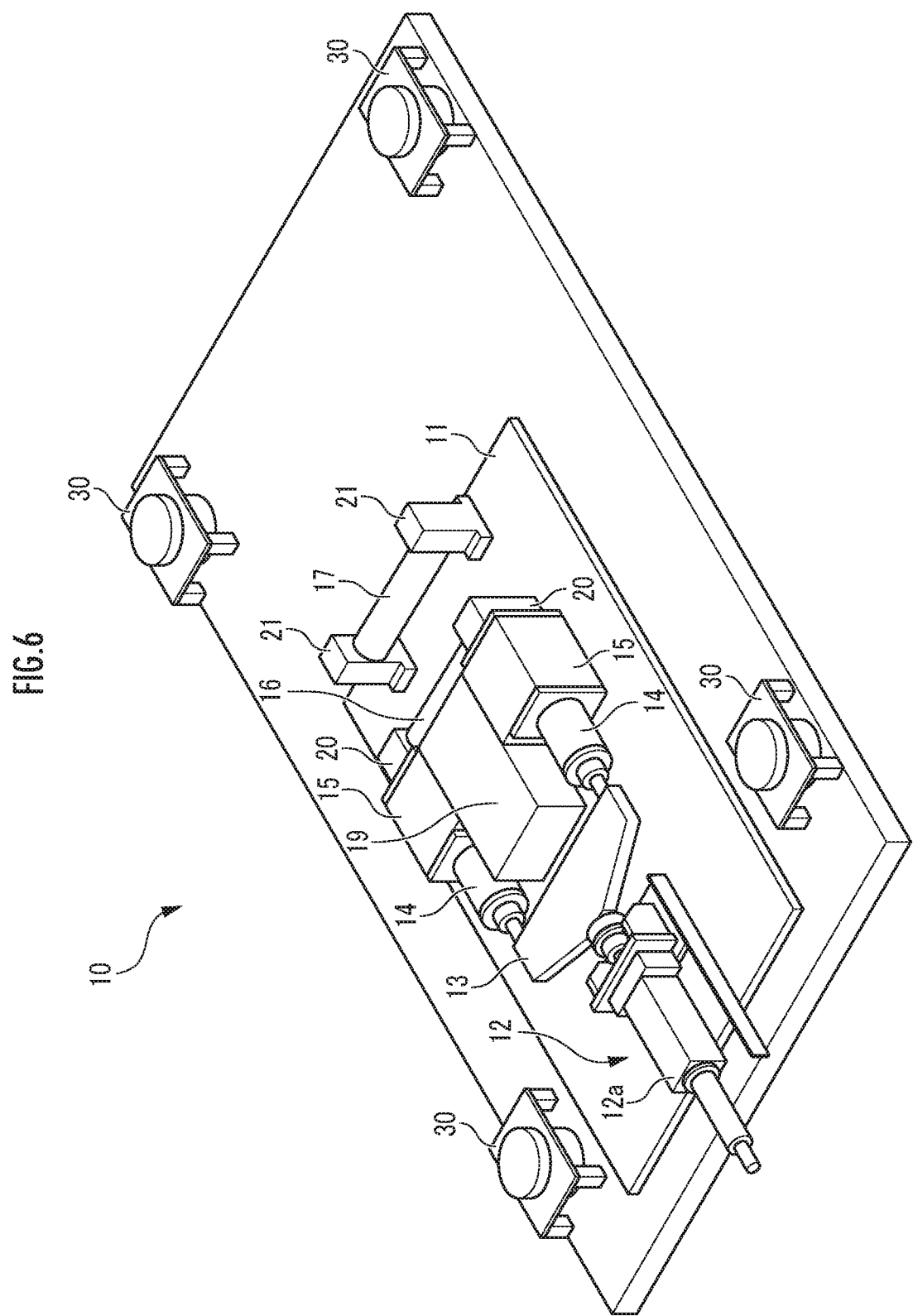
FIG. 6 is a perspective view illustrating a configuration of the vibrator.

Meanwhile, a pair of support pillars 5*d* and 5*d* are provided to a back surface of the front end portion of the front placement plate portion 5 (see FIG. 5). Those support pillars 5*d* and 5*d* extend downward from parts slightly on a rear side of rear ends of the long holes 5*b* in a state where an interval in the left-right direction is provided between each other.

In a state where the front placement plate portion 5 is fixed to the front slope portion 3, a lower end portion of each of the support pillars 5*d* abuts an upper surface of the base plate portion 8. Accordingly, the support pillars 5*d* and 5*d* support the front placement plate portion 5 against a force exerted on the front placement plate portion from above.

The rear end portion of the front placement plate portion 5 is fixed to the rear placement plate portion 6 while being pressed to the front end portion of the rear placement plate portion 6 by the hydraulic clamp device 9A.

An opening 5*g* is provided on a rear side of a central portion of the front placement plate portion 5. This opening 5*g* is formed into a rectangular shape in a planar view and passes through the front placement plate portion 5 in the up-down direction. The vibrator 10 is arranged below this opening 5*g*, and details of this vibrator 10 will be described later.

As described later, this opening 5*g* is for causing a lower side of the wheel W of the vehicle V to be held between a first roller 17 and a second roller 16 of the vibrator 10 via this opening 5*g* in the inspection of the vehicle V.

Thus, the width of this opening 5*g* in the left-right direction is set much wider than the width of an installation surface of the wheel W, and the length in the front-rear direction is set much longer than the length of the installation surface of the wheel W in the front-rear direction. Accordingly, a configuration is made such that the wheel W does not interfere with edge portions of the opening 5*g* when vibration is applied in a state where the lower side of the wheel W is held between the first roller 17 and the second roller 16.

Next, the rear placement plate portion 6 will be described. The rear placement plate portion 6 is in a laterally long rectangular shape in a planar view and extends in the front-rear direction, and four ribs 6*a* are provided to a surface of the rear placement plate portion 6. The four ribs 6*a* have the same functions as the respective four ribs 5*a* described above, and center lines, of the four ribs 6*a*, extending in the front-rear direction are arranged on the same straight fines as center lines of the respective four ribs 5*a*.

Similarly to the ribs 5*a*, those ribs 6*a* have functions of defining a traveling road and of guiding the wheel W of the vehicle V. Accordingly, when the vehicle V travels up onto the placement board 2 and moves to the inspection position in the inspection, the wheels W are guided by the rear placement plate portions 6. In this placement board 2, upper ends of the ribs 5*a* and 6*a* are set to the same height and are parts at the highest height in the placement board 2.

An upper surface of a rear end portion of the rear placement plate portion 6 is arranged at the same height as an upper surface of the front end portion of the above-described front placement plate portion 5, and the rear end portion of the rear placement plate portion 6 and the front end portion of the front placement plate portion 5 are configured to be in plane symmetry. That is, the rear end portion of the rear placement plate portion 6 is placed on the flat surface portion 3*a* of the rear slope portion 3, and a pair of long holes 6*b* and 6*b* are formed between the two ribs 6*a* and 6*a* at both of left and right ends of the rear end portion.

The piston rod 9*c* of the hydraulic clamp device 9 is fitted in each of the long holes 6*b*, and this piston rod 9*c* is also fitted in the long hole 3*c* of the rear slope portion 3.

The rear end portion of the front placement plate portion 5 is placed on the upper surface of the front end portion of the rear placement plate portion 6, and a pair of long holes 6*e* and 6*e* are formed in both of left and right ends of the front end portion. The long holes 6*e* and 6*e* have the same lengths in the front-rear direction as the respective long holes 6*b* and 6*b* and are arranged concentrically with the respective long holes 6*b* in the left-right direction. As described above, the piston rod of the hydraulic clamp device 9A is fitted in each of the long holes 6*e*.

In the above configuration, in a state where the fixing by the hydraulic clamp devices 9 and 9A is released, in the rear placement plate portion 6, the edge portion of the long hole 6*b* and an edge portion of the long hole 6*e* become capable of moving respectively along the piston rod 9*c* of the hydraulic clamp device 9 and the piston rod of the hydraulic clamp device 9A.

Accordingly, the rear placement plate portion 6 is capable of moving in the front-rear direction relatively with respect to the rear slope portion 3 only by the lengths of the long holes 6*b* and 6*e* in the front-rear direction. Specifically, the rear placement plate portion 6 is configured to be capable of moving in the front-rear direction between a maximum length position illustrated in FIG. 2 and a minimum length position illustrated in FIG. 3.

In a state where fixing by the hydraulic clamp device 9 is released, the rear placement plate portion 6 becomes capable of moving in the left-right direction by the length of the long hole 3*c* while the piston rods 9*c* are guided by the long holes 3*c* of the rear slope portion 3. Accordingly, the rear placement plate portion 6 is configured to be capable of moving in the left-right direction between a maximum width position illustrated in FIG. 2 and a minimum width position illustrated in FIG. 3 in a state where the rear placement plate portion 6 is integral with the front placement plate portion 5.

A pair of support pillars 6*d* and 6*d* are provided to a back surface of the rear end portion of the rear placement plate portion 6. Those support pillars 6*d* and 6*d* extend downward from parts slightly on a rear side of rear ends of the long holes 6*h* in a state where an interval in the left-right direction is provided between each other.

In a state where the rear placement plate portion 6 is fixed to the rear slope portion 3, lower end portions of the support pillars 6*d* and 6*d* abut the upper surface of the base plate portion 8. Accordingly, the support pillars 6*d* and 6*d* support the rear placement plate portion 6 against a force exerted on the rear placement plate portion 6 from above.

Three support pillars 6*h*, 6*h*, and 6*h* are provided to a back surface of the front end portion of the rear placement plate portion 6. The three support pillars 6*h*, 6*h*, and 6*h* extend downward from parts between the two long holes 6*e* and 6*e* of the rear placement plate portion 6 in a state where intervals in the left-right direction are provided among each other.

In a state where the rear end portion of the rear placement plate portion 6 is fixed to the rear slope portion 3 by the hydraulic clamp device 9 and the front end portion of the rear placement plate portion 6 is fixed to the front placement plate portion 5 via the hydraulic clamp device 9A, a lower end portion of each of the support pillars 6*h*, 6*h* and 6*h* abuts the upper surface of the base plate portion 8. Accordingly, the support pillars 6h, 6h, and 6h support the rear placement plate portion 6 against a force exerted on the rear placement plate portion 6 from above.

An opening 6g is provided in a central portion of the rear placement plate portion 6. This opening 6g is formed into a rectangular shape in a planar view, passes through the rear placement plate portion 6 in the up-down direction, and is configured to have the same size as the above-described opening 5g of the front placement plate portion 5. The vibrator 10 is arranged below this opening 6g.

Next, the vibrator 10 will be described with reference to FIG. 5 to FIG. 10. For easy understanding, FIG. 5 illustrates a configuration in which the top plate portion 7 is omitted. In the vibrating device 1 of this embodiment, because the vibrator 10 arranged below the opening 5g of the front placement plate portion 5 and the vibrator 10 arranged below the opening 6g of the rear placement plate portion 6 are configured similarly, in the following, a description will be made while raising, as an example, the vibrator 10 arranged below the opening 5g of the front placement plate portion 5.

The vibrator 10 is provided on a movable base plate 11 in a rectangular shape in a planar view, and this movable base plate 11 is fixed to the base plate portion 8 via a magnet clamp not illustrated in a state where a bottom surface of the movable base plate 11 performs surface contact with the upper surface of the base plate portion 8.

Four position changing devices 30 and multiple free bearings (not illustrated) are provided on the upper surface of the base plate portion 8. The tour position changing devices 30 are arranged in a rectangular shape in a planar view, and the movable base plate 11 is provided so as to be surrounded by those position changing devices 30.

Each of the position changing devices 30 includes plural toothed pulleys, a toothed belt wound around those pulleys, a motor mechanism driving one toothed pulley, and so forth (all not illustrated). Both end portions of the toothed belts of the position changing devices 30 are respectively coupled with four predetermined parts of the movable base plate 11. The multiple free bearings are arranged in positions below the movable base plate 11.

In the above configuration, in a state where fixing by the magnet clamp is released, the movable base plate 11 moves on the base plate portion 8, while causing the multiple free bearings to roll, in accordance with rotation operations of the pulleys in the four position changing device 30. That is, the movable base plate 11 is configured to be capable of changing a relative position to the base plate portion 8. The movable base plate 11 is fixed to the base plate portion 8 via the magnet clamp in a position changed as described above.

As illustrated in FIGS. 6 to 10, the vibrator 10 includes a vibrating actuator 12, a vibrating arm 13, two vibrating shafts 14 and 14, two bearing portions 15 and 15, the second roller 16, the first roller 17, a grounding board 18, a path board 19, and so forth.

Figure 8:
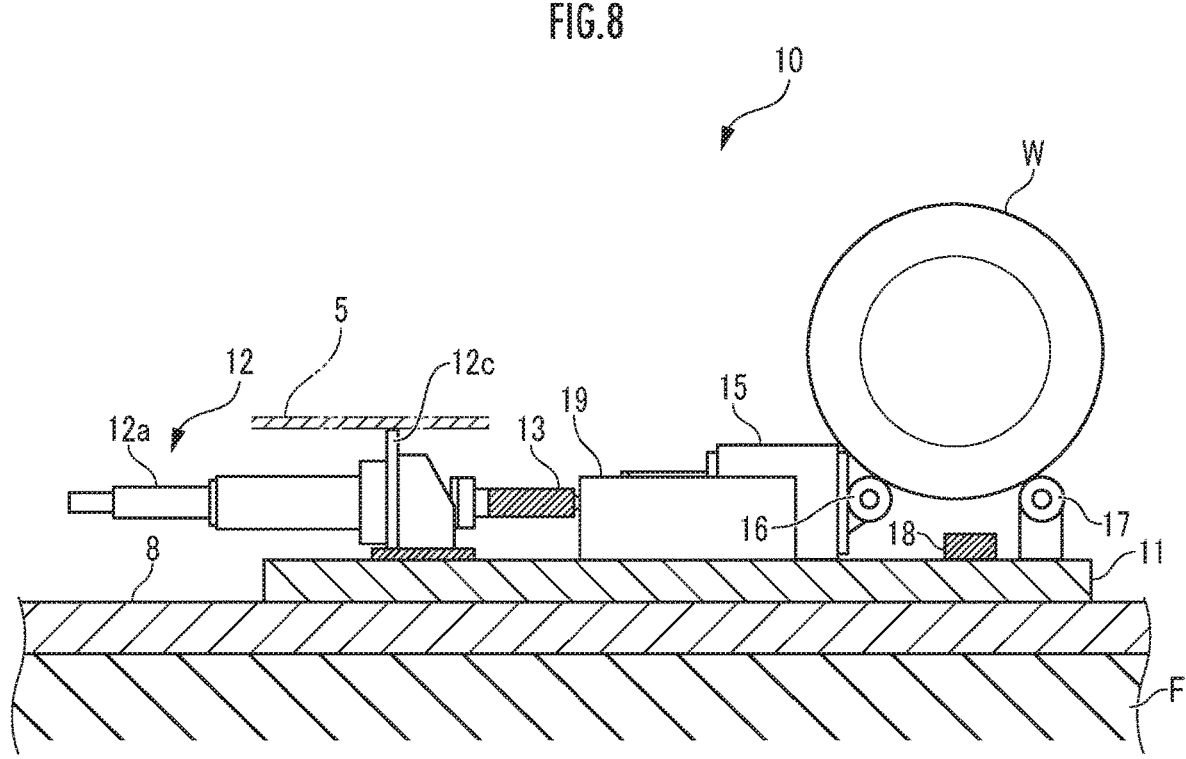
FIG. 8 is a diagram illustrating a cross-sectional view taken along line C-C in FIG. 7 and so forth.
Figure 10:
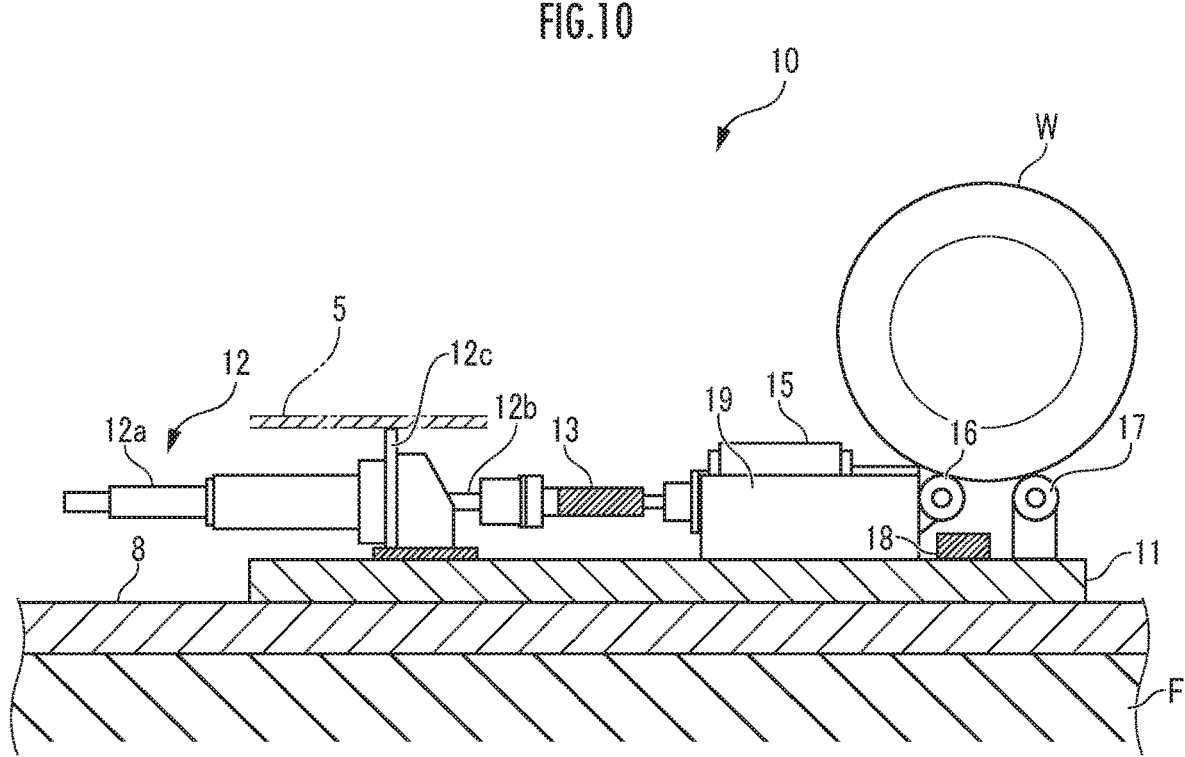
FIG. 10 is a diagram illustrating a cross-sectional view taken along line D-D in FIG. 9 and so forth.

In FIGS. 8, 10, and so forth, for easy understanding, cross-sectional portions of the second roller 16 and the first roller 17 are not hatched.

The vibrating actuator 12 includes a hydraulic cylinder 12a, a piston rod 12b, a bracket 12c, and so forth. This bracket 12c is for supporting the hydraulic cylinder 12a, and a lower end portion of the bracket 12c is fastened to the movable base plate 11 by a bolt. The bracket 12c is fastened to the front placement plate portion 5 by a bolt in a state where an upper end portion of the bracket 12c abuts a lower surface of the front placement plate portion 5. This hydraulic cylinder 12a is connected with a hydraulic circuit (not illustrated) and is supplied with a hydraulic pressure from this hydraulic circuit.

The vibrating arm 13 is coupled with a tip end portion of the piston rod 12b of the vibrating actuator 12. In this vibrating actuator 12, the hydraulic pressure supplied from the above-described hydraulic circuit to the hydraulic cylinder 12a is controlled by the above-described control device, and the piston rod 12b is thereby driven. The piston rod 12b is configured to drive the vibrating arm 13 in the front-rear direction and to vibrate the vibrating arm 13 in accordance with the hydraulic pressure.

Both of left and right end portions of the vibrating arm 13 are respectively coupled with front end portions of the vibrating shafts 14 and 14 via ball joints 14a and 14a. Those vibrating shafts 14 and 14 are arranged at an interval in the left-right direction, extend in the front-rear direction in parallel with each other, and are supported by the hearing portions 15 and 15 slidably in the front-rear direction.

In each of the bearing portions 15, two hydrostatic bearings 15a and 15a are arranged side by side in the front-rear direction at a predetermined interval, and the vibrating shaft 14 is supported by those hydrostatic bearings 15a and 15a such that when the vibrating shaft 14 vibrates in the front-rear direction, vibration in directions perpendicular to the front-rear direction (for example, the left-right and up-down directions) is inhibited by the hydrostatic bearings 15a and 15a.

As illustrated in FIG. 5, the front-side edge portion of the opening 5g of the front placement plate portion 5 serves as a mounting portion 5c. This mounting portion 5c extends in the front-rear direction with a predetermined length, and left and right end portions of the mounting portion 5c are respectively fixed to upper surfaces of the bearing portions 15 and 15 aria screws not illustrated. The edge portions 5h and 5h, of the opening 5g, positioned in the left-right direction of the mounting portion 5c of the front placement plate portion 5 are respectively fixed to the upper surfaces of the bearing portions 15 and 15 via screws not illustrated.

As described above, the upper surfaces of the bearing portions 15 and 15 are fixed to the front placement, plate portion 5, lower surfaces are fixed to the movable base plate 11, and the bearing portions 15 and 15 thereby have a function of enhancing rigidity of the placement board 2.

Figure 11:
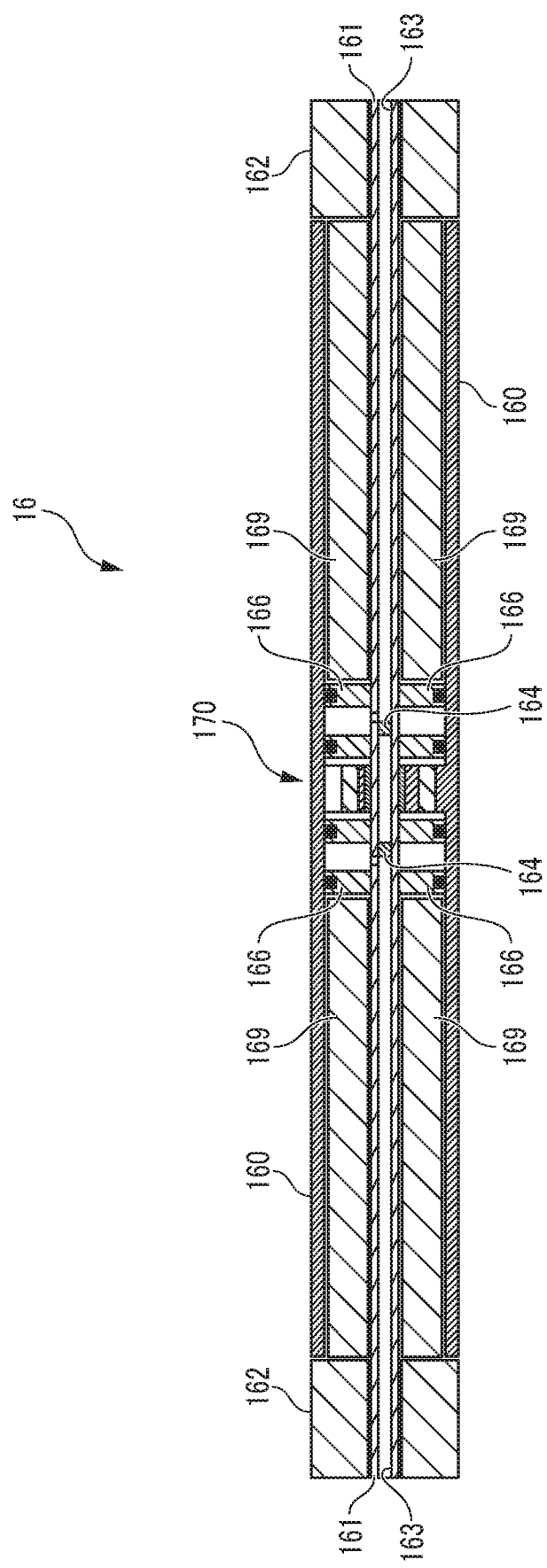
FIG. 11 is a cross-sectional view of the second roller.
Figure 12:
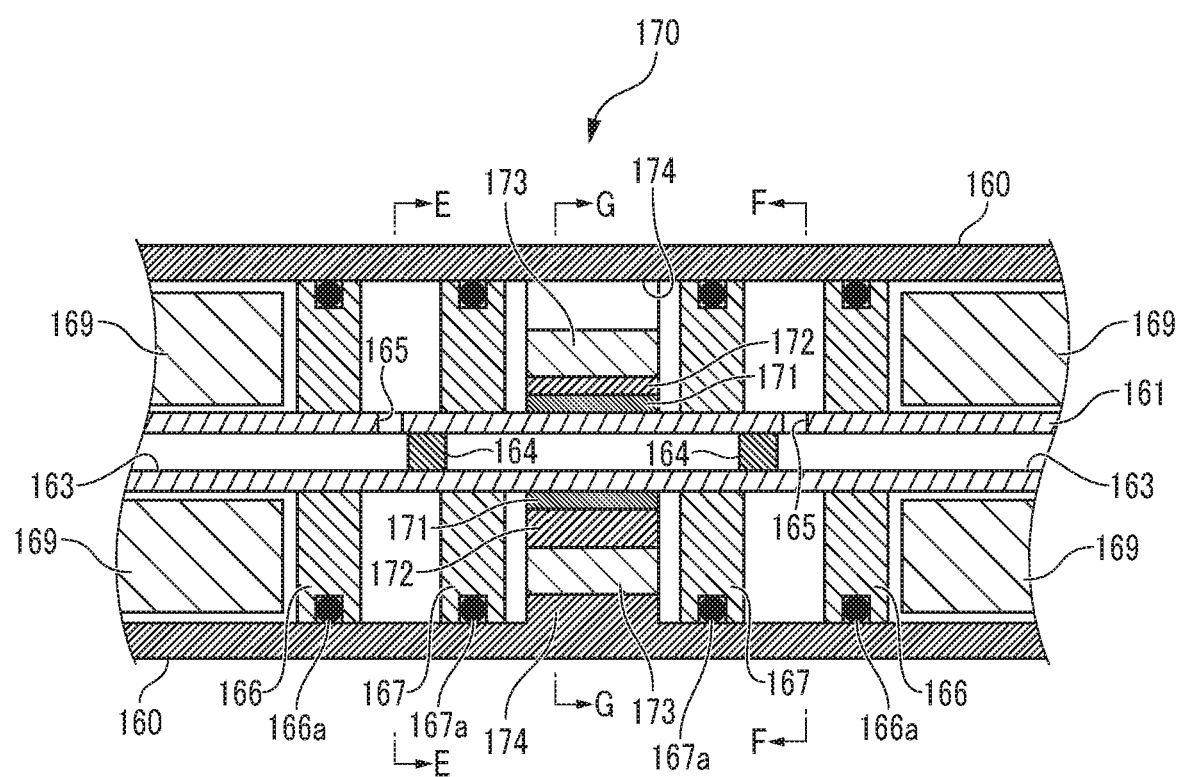
FIG. 12 is a cross-sectional view in which an area around a rotating actuator of the second roller is enlarged.

Rear end portions of the vibrating shafts 1 and 14 respectively serve as two shall mounting portions 20 and 20, and the second roller 16 is provided between those shaft mounting portions 20 and 20. As illustrated in FIG. 11 and FIG. 12, this second roller 16 includes a rotating portion 160, a fixed shall 161, two bearings 169 and 169, a rotating actuator 170, and so forth. In the following description of the second roller 16, the left side in FIG. 11 will be referred to as "left", and the right side will be referred to as "right".

This rotating portion 160 is configured with a hollow cylindrical member and extends in the left-right direction with a predetermined length. The fixed shall 161 is configured with a hollow cylindrical member with a smaller diameter than the rotating portion 160 and extends in the left-right direction longer than the rotating portion 160.

The two bearings 169 and 169 are provided between an inner wall surface of the rotating portion 160 and an outer peripheral surface of the fixed shaft 161, and those bearings 169 and 169 are configured with rolling bearings. The rotating portion 160 is supported by those bearings 169 and 169 so as to be rotatable around an axis line of the fixed shaft 161.

Meanwhile, mounting portions 162 and 162 are mounted on both of left and right end portions of the fixed shaft 161 by caulking. Those mounting portions 162 and 162 are respectively fixed to the above-described mounting portions 20 and 20, and both of the left and right end portions of the fixed shaft 161 are thereby fixed to the mounting portions 20 and 20.

Sealing members 164 and 164 are provided, at a predetermined interval, in parts of an inner hole 163 of the fixed shaft 161, the parts being close to the center of the fixed shaft 161. In this fixed shaft 161, a portion between the sealing members 164 and 164 in the inner hole 163 is closed by those sealing members 164 and 164.

In the fixed shaft 161, communication holes 165 and 165 are formed in positions on slightly outer sides, in the axis line direction, of the sealing members 164 and 164, and those communication holes 165 and 165 pass through a wall of the fixed shaft 161. An oil path is formed with the above inner hole 163, sealing members 164 and 164, and communication holes 165 and 165, and a configuration is made such that hydraulic oil is supplied from the hydraulic circuit not illustrated to this oil path.

In the fixed shaft 161, a pair of left and right sealing walls 166 and 166 are fixed in positions on slightly outer sides, in the axis line direction, of the communication holes 165 and 165, and a pair of left and right partition walls 167 and 167 are fixed in positions on slightly inner sides, in the axis line direction, of the communication holes 165 and 165. Each of the sealing walls 166 is a disk-shaped member integrally extending outward in the radial direction from the fixed shaft 161, and an outer peripheral surface of each of the sealing walls 166 is set to substantially the same diameter as an inner peripheral surface of the rotating portion 160.

In this outer peripheral surface, a recess portion extends in the circumferential direction throughout a whole circumference, and an O-ring 166a is provided in this recess portion. This O-ring 166a liquid-tightly seals a portion between each of the sealing walls 166 and the rotating portion 160.

Similarly to the sealing wall 166, the left partition wall 167 is a disk-shaped member integrally extending outward in the radial direction from the fixed shaft 161, and an outer peripheral surface of the left partition wall. 167 is set to substantially the same diameter as the inner peripheral surface of the rotating portion 160.

In this outer peripheral surface, a recess portion extends in the circumferential direction throughout a whole circumference, and an O-ring 167a is provided in this recess portion. This O-ring 167a liquid-tightly seals a portion between the left partition wall 167 and the rotating portion 160.

Figure 13:
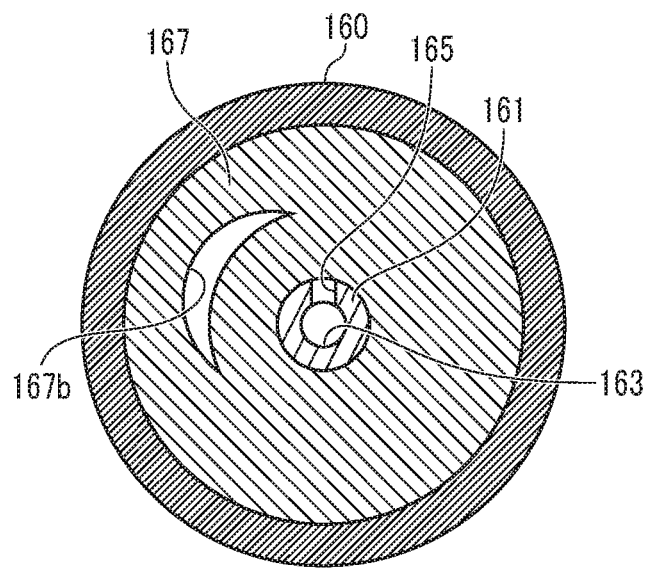
FIG. 13 is a diagram illustrating a cross-sectional view taken along line E-E in FIG. 12 and so forth.

As illustrated in FIG. 13, a crescent-shaped oil hole 167b is formed in a predetermined part of the left partition wall 167, and this oil hole 167b passes through the left partition wall 167 in the left-right direction.

Figure 14:
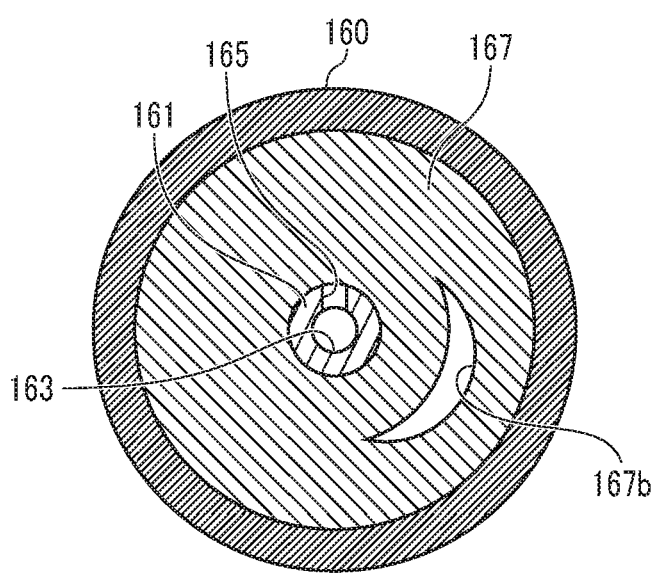
FIG. 14 is a diagram illustrating a cross-sectional view taken along line F-F in FIG. 12 and so forth.

As for the right partition wall 167, similarly to the left partition wall 167, the O-ring 167a liquid-tightly seals a portion between the right partition wall 167 and the rotating portion 160. As illustrated in FIG. 14, in the right partition wall 167, the crescent-shaped oil hole 167b is formed in a different predetermined part in the circumferential direction compared to the oil hole 167b of the left partition wall 167.

Figure 15:
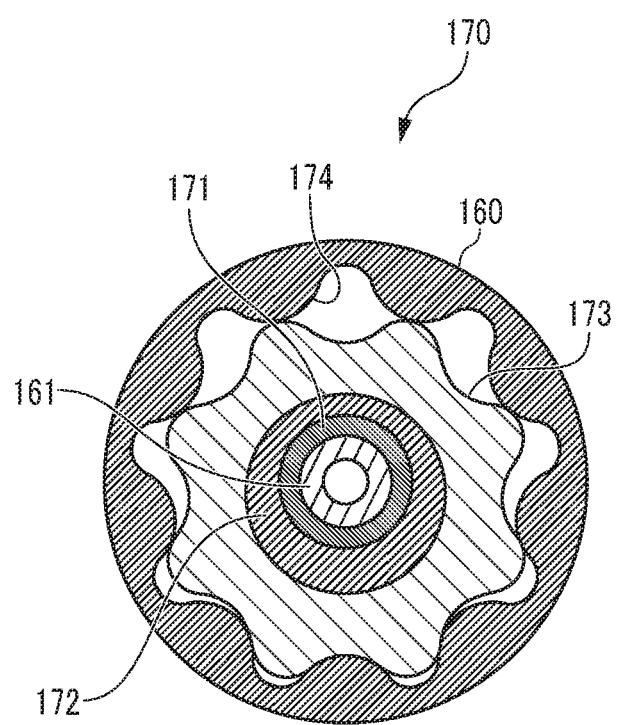
FIG. 15 is a diagram illustrating a cross-sectional view taken along line G-G in FIG. 12 and so forth.

Meanwhile, the rotating actuator 170 is arranged between the left and right partition walls 167 and 167 and, as illustrated in FIG. 12 and FIG. 15, includes a bearing 171, an eccentric spacer 172, a trochoid external gear 173, and a trochoid internal gear 174 in order from an inner side to an outer side in the radial direction. This bearing 171 is provided to be rotatable around an axis line of the fixed shaft 161.

The eccentric spacer 172 is an annular member that is formed such that the thickness changes in the circumferential direction, and an inner peripheral surface of the eccentric spacer 172 abuts the bearing 171. The trochoid external gear 173 includes an inner hole, and an outer peripheral surface of the eccentric spacer 172 is fixed to this inner hole with no gap therebetween. In the above configuration, during an action of the rotating actuator 170, the trochoid external gear 173 rotates around the axis line of the fixed shaft 161 via the bearing 171.

In this case, the central axis of the fixed shaft 161 is eccentric with respect to the center of the trochoid external gear 173 due to the shape of the eccentric spacer 172, and the trochoid external gear 173 rotates eccentrically with respect to the trochoid internal gear 174.

The trochoid internal gear 174 is integrally formed with the rotating portion 160 while protruding from the inner peripheral surface of the rotating portion 160. The number of teeth of this trochoid internal gear 174 is set to be greater than that of the trochoid external gear 173 by one.

In such a configuration, as described above, when the trochoid external gear 173 eccentrically rotates, one gear tooth of the trochoid external gear 173 does not mesh with gear teeth of the trochoid internal gear 174, and a gear tooth on the opposite side to this one gear tooth meshes with the gear teeth of the trochoid internal gear 174 across the center of the fixed shaft 161 (see FIG. 15). Further, in accordance with rotation of the trochoid external gear 173, the gear tooth not meshing with the trochoid internal gear 174 and the gear tooth meshing with the trochoid internal gear 174 are shifted to respective neighboring gear teeth.

The hydraulic oil is supplied from the hydraulic circuit, and the rotating actuator 170 configured as described above thereby rotates and drives the second roller 16 as described in the following. That is, the hydraulic oil flows into the rotating actuator 170 via the inner hole 163 of the fixed shaft 161, the communication hole 165, and the oil hole 167b of the partition wall 167 and thereafter flows between the trochoid external gear 173 and the trochoid internal gear 174.

When the hydraulic oil flows as described above, the trochoid external gear 173 eccentrically rotates around the axis line of the fixed shaft 161, and in accordance with this, the trochoid internal gear 174 rotates at a slower rotation speed than the trochoid external gear 173. As a result, the rotating portion 160 is driven to rotate around the axis line of the fixed shaft 161. That is, the second roller 16 is driven to rotate.

The hydraulic oil flowing between the trochoid external gear 173 and the trochoid internal gear 174 then flows to return to the hydraulic circuit via the oil hole 167b of the partition wall 167 and the communication hole 165 and inner hole 163 of the fixed shaft 161.

As described above, the second roller 16 is configured to be capable of being driven to rotate around the central axis line by the rotating actuator 170. During an operation of the vibrating device 1, in a case where the wheel W to be vibrated is a driving wheel W and the driving wheel W is in a creep state, the second roller 16 is driven as described in the following by the rotating actuator 170. That is, the second roller 16 rotates in the reverse direction to a rotation direction of the driving wheel W and is driven such that the rotation speed ratio between the driving wheel W and the second roller 16 becomes a value within a predetermined range including the reciprocal value of the radius ratio of the driving wheel W and the second roller 16 (for example, a range of the reciprocal value±several %).

This is for more appropriately reproducing a vibration state in a case where the driving wheel W travels over a protrusion on a road surface during travel of a vehicle by efficiently transmitting a vibrating force of the second roller 16 to the driving wheel W while the second roller 16 is inhibited from becoming rotational resistance to the driving wheel W.

Figure 9:
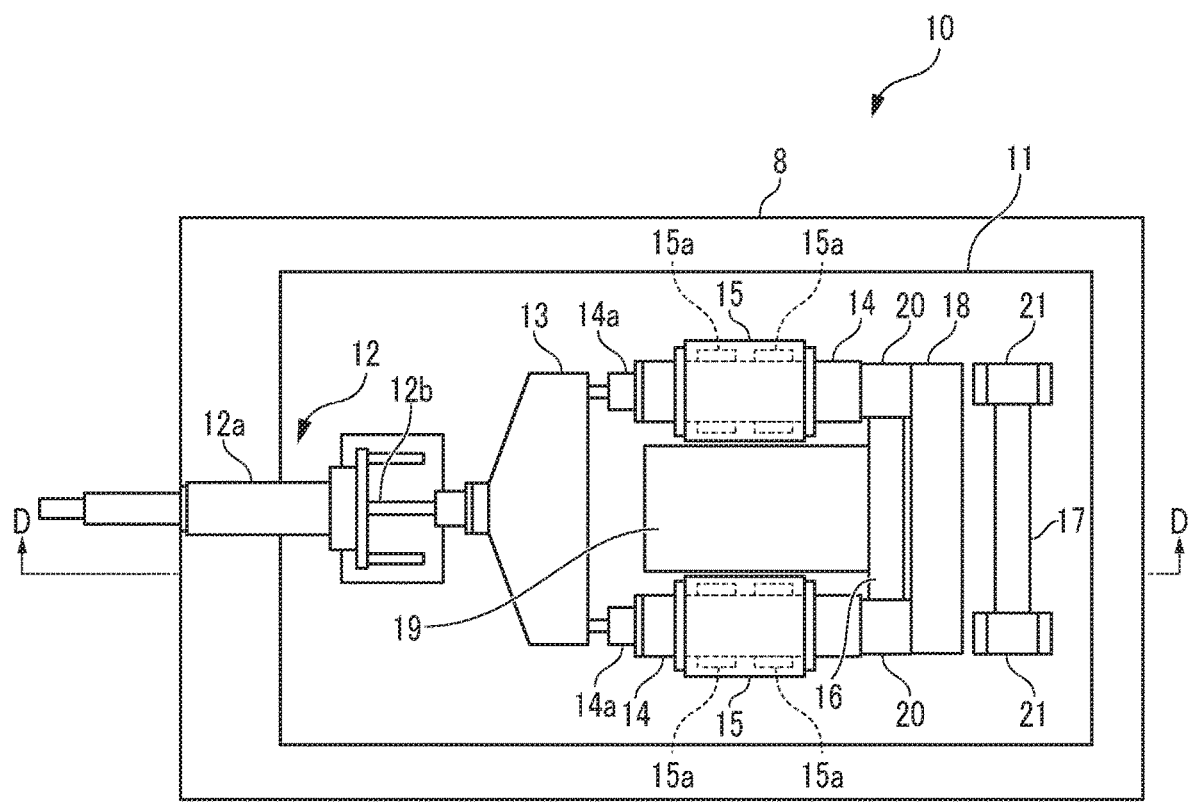
FIG. 9 is a plan view illustrating a state where the second roller of the vibrator is in an extruded position.

During the operation of the vibrating device 1, the second roller 1_6 is driven, by the vibrating actuator 12, at least between a vibrating position (for example, a position illustrated in FIGS. 7 and 8) and an extruded position (for example, a position illustrated in FIGS. 9 and 10). Vibration in the front-rear direction generated by the vibrating actuator 12 is input to the second roller 16 via the vibrating arm 13 and the vibrating shafts 14 and 14.

Meanwhile, a pair of shaft mounting portions 21 and 21 are provided on a rear side of the second roller 16. Between those shaft mounting portions 21 and 21, a columnar support shaft 21a (see FIG. 17) extends in the left-right direction in a position at a predetermined height from an upper surface of the movable base plate 11, and both end portions of the support shaft 21a is fixed to the shaft mounting portions 21 and 21. The first roller 17 is formed into a hollow cylindrical shape, and an inner peripheral surface of the first roller 17 is fitted onto the support shaft 21a.

In the above configuration, the first roller 17 is rotatable around the central axis line in forward and reverse directions. The first roller 17 is arranged such that an upper end of the first roller 17 is in a position slightly higher than an upper end of the second roller 16. The first roller 17 may be arranged such that the upper end is in the same position as the upper end of the second roller 16.

In the inspection of the vehicle V, in view of the fact that the lower side of the wheel W of the vehicle V is held by the above first roller 17 and second roller 16, the sizes of those first roller 17 and second roller 16 in the left-right direction are set to values sufficiently greater than the width of the wheel W.

The above-described grounding board 18 is fixed to a portion on the movable base plate 11 between the first roller 17 and the second roller 16, This grounding board 18 has a rectangular cuboid shape long in the left-right direction and is arranged in parallel with the first roller 17 and the second roller 16, and both ends of the grounding board 18 extend to the same positions as end surfaces of a pair of bearings 17a and 17a.

In a case of this grounding board. 18, an interval between an upper surface of the rounding board 18 and an upper end surface of the rib 5a of the front placement plate portion 5 is set to be a smaller value than the lowest ground height of the vehicle V. This is for avoiding a situation, in which a part at the lowest ground height in a bottom surface of a vehicle body of the vehicle V abuts the upper end surface of the rib 5a of the placement plate portion 5, even in a case where an interval between the first roller 17 and the second roller 16 becomes wider for some reason in vibrating or the like and the wheel W moves downward.

The above-described path board 19 is arranged between the bearing portions 15 and 15 on the movable base plate 11. The path board 19 has a rectangular cuboid shape long in the front-rear direction and has a hydraulic actuator (not illustrated) that is built therein. The path board 19 is driven, by this hydraulic actuator, at least in the front-rear direction between a retreating position (for example, a position illustrated in FIGS. 7 and 8) and an abutting position (for example, a position illustrated in FIGS. 9 and 10) in which the path board 19 abuts the second roller 16 in the extruded position.

In a case where the path board 19 moves to the abutting position and abuts the second roller 16 in the extruded position, the second roller 16 is retained by the path board 19 in a non-rotatable manner. This is for transmitting a driving force of the wheel W to the second roller 16 and thereby facilitating forward movement of the wheel W, by retaining the second roller 16 in a rotation-stop state when the wheel W of the vehicle V moves forward while traveling over the second roller 16 after a vibrating operation is finished.

An upper surface of the path board 19 functions as a path for the wheel W when the wheel W moves forward as described above, and the height of the upper surface of the path hoard 19 is thus set to the same height as an upper surface of the second roller 16.

The left half portion of the placement board 2 is configured as described above, and the right half portion of the placement board 2 is similarly configured.

Next, a description will be made about an operation in the vibrating device 1 configured as described above in a case where the vehicle V is inspected. In the following description, it is assumed that the vehicle V is of a front-wheel-drive vehicle type, and as for an operation of the vibrator 10, an example of a case of mainly vibrating a front driving wheel W will be described. The same applies to a description of a vibrator 10A which will be described later.

First, the hydraulic clamp devices 9 and 9A are loosened, and the two front placement plate portions 5 and the two rear placement plate portions 6 are set to a state where those are capable of moving in the front-rear direction and the left-right direction. In addition, the magnet clamps are loosened, and the four movable base plates 11 are set to a state where those are capable of moving with respect to the base plate portion 8.

Then, in the above state, the four movable base plates 11 are respectively moved to the positions corresponding to a wheelbase and treads of the vehicle V as the inspection target by the four position changing device 30 and are thereafter fixed to the base plate portion 8 by the magnet clamps. In response to the movement of the movable base plates 11, the two front placement plate portions 5 and the two rear placement plate portions 6 move to the positions corresponding to the wheelbase and the treads, simultaneously with the movable base plates 11. Then, in those positions, those front placement plate portions 5 and rear placement plate portions 6 are fixed to each other via the hydraulic clamp devices 9A and are simultaneously fixed to the front and rear slope portions 3 and 3 via the hydraulic clamp devices 9 and 9.

Next, the vibrating actuator 12 in each of the vibrators 10 is driven, and the interval between the first roller 17 and the second roller 16 is thereby set to a value adjusted for the size of the wheel W of the vehicle V as the inspection target. Accordingly, a preparation operation for the inspection is finished.

Figure 16:
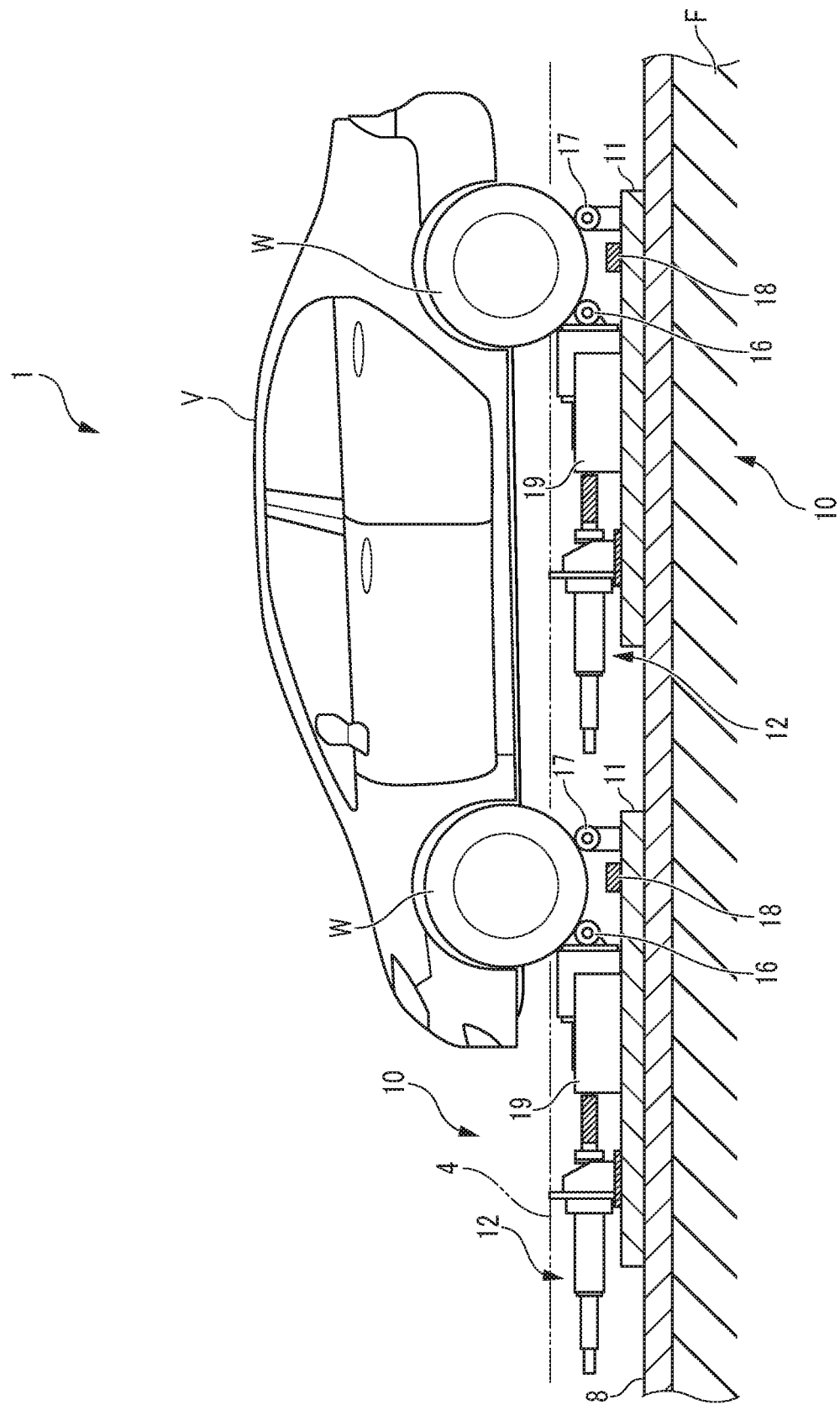
FIG. 16 is a diagram illustrating a state where a vehicle is placed on the vibrating device while being capable of being vibrated.

Next, the vehicle V is moved so as to travel up onto the placement board 2 from the rear slope portions 3, and as illustrated in FIG. 16, the four wheels W are fitted into the openings 5g of the front placement plate portions 5 and the openings 6g of the rear placement plate portions 6, move downward, and are respectively held between the first rollers 17 and the second rollers 16 in the front-rear direction. Then, while an engine of the vehicle V is idled, a driving system of the vehicle V is retained in a state where motive power is capable of being transmitted between the engine and the driving wheels W (in-gear state).

Until this time point, a state is retained where the hydraulic oil does not flow to the rotating actuator 170 of the second roller 16. Then, when the wheel W rotates in the direction indicated by an arrow Y4 in FIG. 17 due to a creep torque of the vehicle V, in accordance with this, the rotating portion 160 of the second roller 16 is driven to rotate in the direction indicated by an arrow Y1 in FIG. 17, After the rotating portion 160 of the second roller 16 starts rotation as described above, the hydraulic oil is supplied from the hydraulic circuit to the rotating actuator 170 such that the rotating portion 160 is driven in the direction of the rotation.

The reason why the hydraulic oil is supplied to the rotating actuator 170 at such a timing is because in a case of the rotating actuator 170 of this embodiment, in which direction of forward rotation or reverse rotation the rotating portion 160 in a stop state starts rotating when the hydraulic oil is supplied is not determined for structural reasons.

As described above, while the second roller 16 is driven to rotate by the rotating actuator 170, the second roller 16 is driven in the front-rear direction by the vibrating actuator 12, and the driving wheel W is thereby vibrated. During this vibrating operation, rotation states of the second roller 16 and the first roller 17 become states illustrated in FIG. 17 and FIG. 18. That is, when the second roller 16 moves in the direction indicated by an arrow Y3 in FIG. 17 (rearward) to approach the first roller 17, the second roller 16 presses the driving wheel W toward the first roller 17 side while rotating in the direction of the arrow Y1 in FIG. 17.

Figure 17:
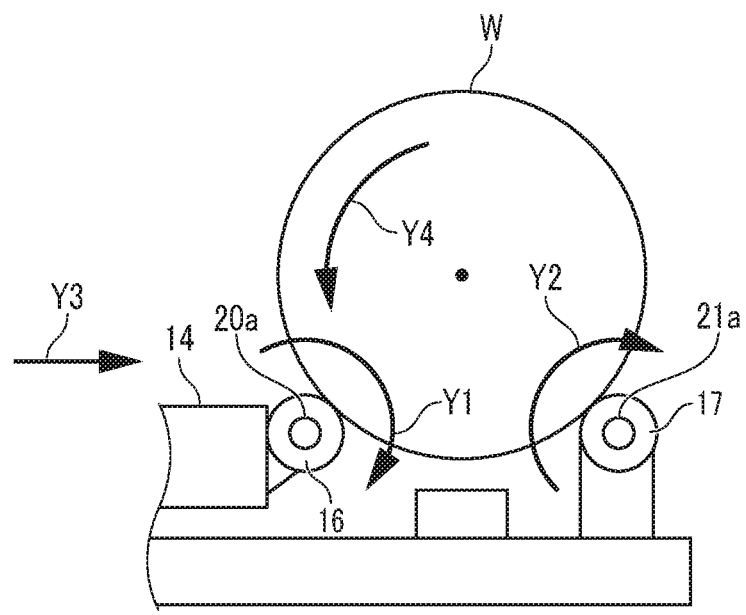
FIG. 17 is a diagram illustrating one example of an operation state in a case where the second roller presses a driving wheel rearward when the driving wheel is vibrated.

That is, when the driving wheel W rotates in the direction indicated by the arrow Y4 in FIG. 17, the second roller 16 presses the driving wheel W while rotating in the reverse direction to the driving wheel W in order to inhibit the second roller 16 from becoming rotational resistance to the driving wheel W.

Figure 19:
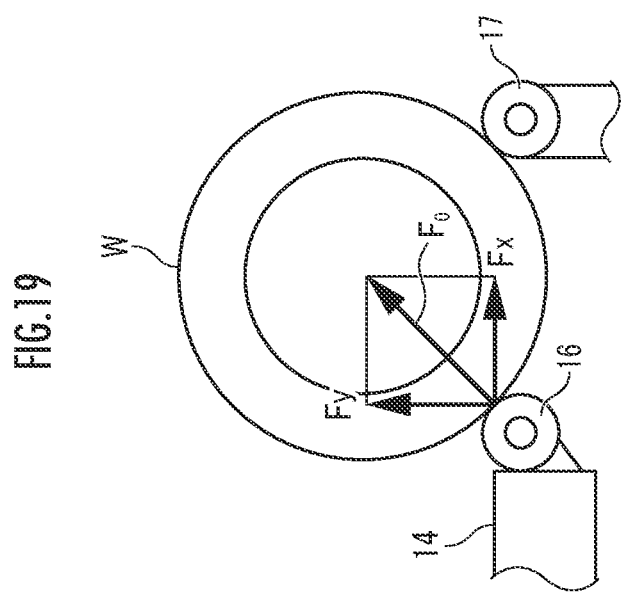
FIG. 19 is an explanatory diagram illustrating a pressing force exerted on the wheel in vibrating and component forces of the pressing force.

In this case, when a pressing force Fo of the second roller 16 is exerted on the driving wheel W, as illustrated in FIG. 19, two component forces Fx and Fy of the pressing force Fo is exerted on the driving wheel W. That is, the second roller 16 is vibrated in the front-rear direction, and the driving wheel W is thereby vibrated simultaneously in the front-rear direction and the up-down direction.

In this case, although the second roller 16 receives a reaction force causing rotation in the reverse direction to the arrow Y1 from the driving wheel W, the second roller 16 can efficiently transmit the pressing force Fo, that is, the vibrating force to the driving wheel W while resisting the reaction force by a torque of the rotating actuator 170.

When the second roller 16 presses the driving wheel W toward the first roller 17 side, the first roller 17 also rotates in the direction indicated by an arrow Y2 in FIG. 17. Accordingly, the first roller 17 can be inhibited from becoming rotational resistance to the driving wheel W.

Figure 18:
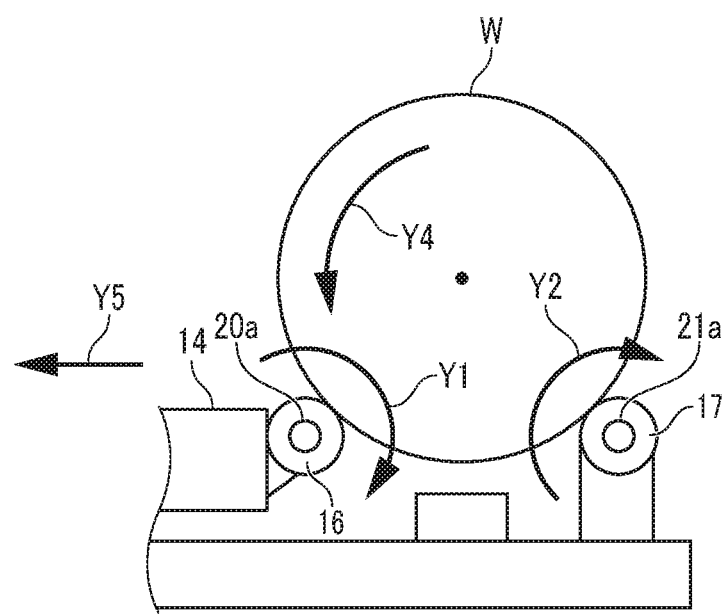
FIG. 18 is a diagram illustrating one example of an operation state in a case where the second roller returns forward when the driving wheel is vibrated.

When from this state, the second roller 16 moves in the direction indicated by an arrow Y5 in FIG. 18 (forward) away from the first roller 17, the second roller 16 rotates in the direction of the arrow Y1 in order to inhibit the second roller 16 from becoming the rotational resistance to the driving wheel W. Simultaneously with this, the first roller 17 rotates in the direction indicated by the arrow Y2 in FIG. 18 while abutting the wheel W. Accordingly, the first roller 17 can be inhibited from becoming the rotational resistance to the driving wheel W.

As described above, the driving wheel W rotating in the creep state is vibrated by the vibrator 10, and the vehicle V is vibrated via the driving wheel W. Accordingly, the vibration state of the vehicle. V in a case where the front driving wheel W travels over a protrusion on a road surface during travel of the vehicle can appropriately be reproduced.

In a case where the wheel W to be vibrated by the vibrator 10 is an idler wheel W, supply of the hydraulic oil to the rotating actuator 170 is stopped, and a state is retained where the second roller 16 is not driven by the rotating actuator 170. Accordingly, the second roller 16 and the first roller 17 rotate in accordance with free rotation of the idler wheel W.

Figure 7:
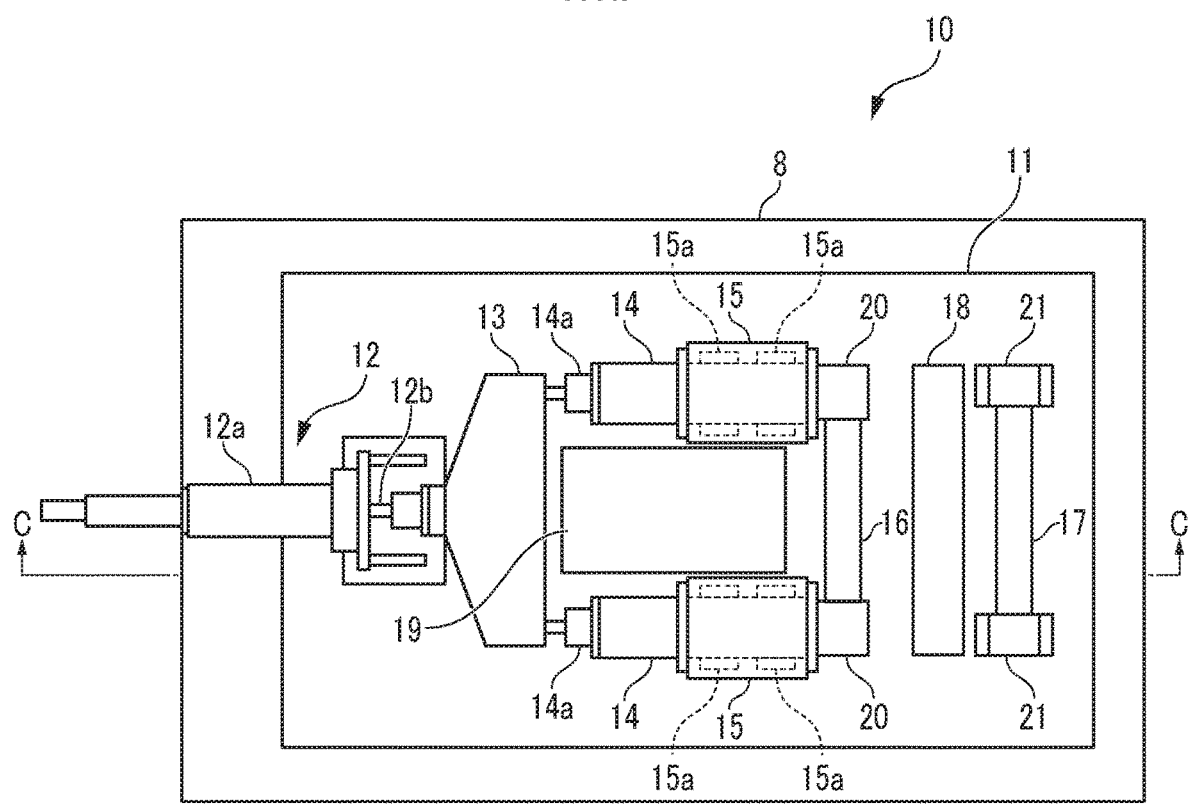
FIG. 7 is a plan view illustrating a state where a second roller of the vibrator is in a vibrating position.

In a case where the vibrating operation as described above is executed for a predetermined time and the inspection of the vehicle V is finished, the second roller 16 is moved, by the vibrating actuator 12, from the vibrating position illustrated in FIGS. 7 and 8 to the extruded position illustrated in FIGS. 9 and 10. Simultaneously with this, the path board 19 is moved, by the hydraulic actuator, from the retreating position illustrated in FIGS. 7 and 8 to the abutting position illustrated in FIGS. 9 and 10. Accordingly, a rear end portion of the path board 19 abuts the second roller 16 in the extruded position, and the second roller 16 is thereby retained in the rotation-stop state.

The vehicle V starts moving forward in this state, and the driving wheel W can thereby easily get out of a portion between the two rollers 16 and 17 while traveling over the second roller 16 in the rotation-stop state. Accordingly, the vehicle V can move forward and down from the placement board 2 via the front slope portions 3.

As described above, in the vibrating device 1 of the first embodiment, in the vibrating operation, the wheel W of the vehicle V is held between the first roller 17 and the second roller 16 in the front-rear direction. The second roller 16 is driven by the vibrating actuator 12 in the front-rear direction of the wheel W in this state, and the wheel W is thereby vibrated via the second roller 16. Accordingly, the wheel W is vibrated by the second roller 16 in a state where a lower side portion of the wheel W is held between the first roller 17 and the second roller 16.

In a case where the wheel W to be vibrated by the vibrating device 1 is the driving wheel W, for example, under a condition in which a creep phenomenon in the vehicle V occurs, a slight torque is transmitted to the driving wheel W, and the driving wheel W rotates. In this case, the second roller 16 is driven by the rotating actuator 170 such that the rotation direction of the second roller 16 becomes the reverse direction to the driving wheel W and the rotation speed ratio between the driving wheel W and the second roller 16 becomes a value within a predetermined range including the reciprocal value of the radius ratio between the driving wheel W and the second roller 16, and the second roller 16 can thereby be inhibited from becoming the rotational resistance to the driving wheel W as much as possible.

In addition, as described above, when the driving wheel W is pressed toward the first roller 17 side by the second roller 16, the pressing force Fo of the second roller 16, that is, the vibrating force can efficiently be transmitted to the driving wheel W while the second roller 16 resists the reaction force from the driving wheel W by the torque of the rotating actuator 170.

Meanwhile, in a case where the wheel W to be vibrated by the vibrating device 1 is the idler wheel W, supply of the hydraulic oil to the rotating actuator 170 is stopped, and the second roller 16 is not driven by the rotating actuator 170. Accordingly, the second roller 16 rotates in accordance with free rotation of the idler wheel W, and the second roller 16 can thereby be inhibited from hindering the free rotation of the idler wheel W, As described above, in a case where the wheel W is either one of the idler wheel W and the driving wheel W, the vibration state in a case where the wheel W travels over a protrusion on a road surface during travel of the vehicle can appropriately be reproduced.

The first embodiment is an example where a member rotating around the central axis line the columnar support shaft 21a is used as the first roller 17. However, a first roller of the present invention is not limited to this but may be a member that abuts a wheel from one side of the wheel of a vehicle in the front-rear direction, is thereby arranged to regulate movement of the wheel to one side in the front-rear direction, and is rotatable around an axis line along the rotation axis of the wheel. For example, as the first roller, a solid columnar member may be used whose both end portions are rotatably supported by two bearings.

The first embodiment is an example where a member in which the rotating portion 160 rotates around the central axis line of the fixed shaft 161 is used as the second roller 16. However, a second roller of the present invention is not limited to this but may be a member that is arranged to be capable of moving in the front-rear direction of the wheel, abuts the wheel from the other side of the wheel in the front-rear direction, is thereby capable of holding a lower side portion of the wheel between the member and the first roller, and is rotatable around an axis line along the rotation axis of the wheel. For example, as the second roller, a member in the same configuration as the first roller 17 may be used. In this case, a configuration may be made such that the second roller is driven to rotate in a predetermined direction by a rotating actuator.

The first embodiment is an example where the hydraulically driven vibrating actuator 12 is used as a vibrating actuator. However, a vibrating actuator of the present invention is not limited to this but may be a member that vibrates the wheel via the second roller by driving the second roller in the front-rear direction of the wheel. For example, as the vibrating actuator, an electric actuator may be used.

Meanwhile, the first embodiment is an example where the hydraulically driven rotating actuator 170 is used as a rotating actuator. However, a rotating actuator of the present invention is not limited to this but may be a member that is capable of driving the second roller in a predetermined rotation direction. For example, as the rotating actuator, a member may be used in which an electric motor and a gear mechanism are combined together.

The first embodiment is an example where the rotating actuator 170 is built in the second roller 16; however, instead of this, the rotating actuator may be provided on the outside of the second roller 16.

The first embodiment is an example where the vehicle V is placed on the vibrating device 1 in a state illustrated in FIG. 16 and the vehicle V is vibrated; however, a configuration may be made such that the vehicle V is placed on the vibrating device 1 in a reverse state to FIG. 16 in the front-rear direction and the vehicle V is vibrated.

Figure 20:
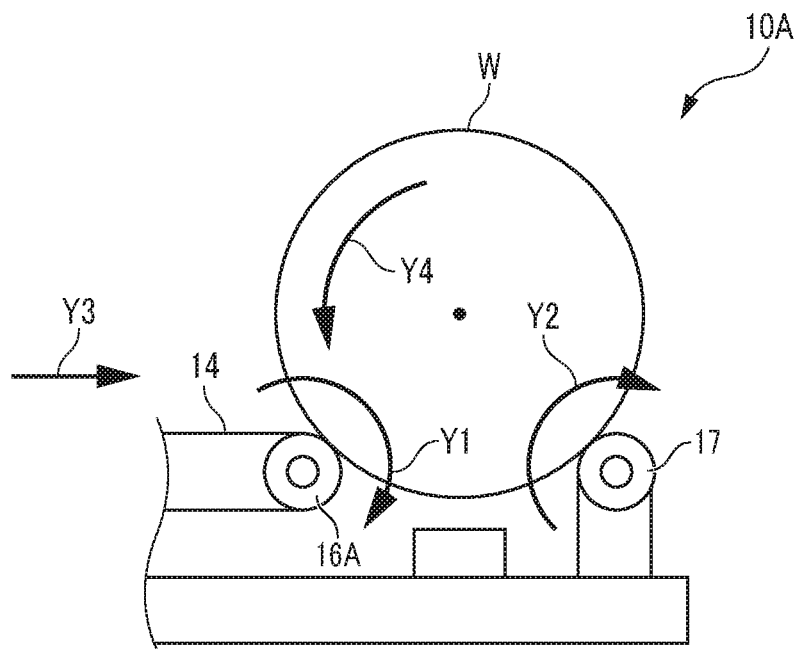
FIG. 20 is a diagram illustrating one example of an operation state in a case where a second roller presses the driving wheel rearward when the driving wheel is vibrated in a vibrator of a modification example.
Figure 21:
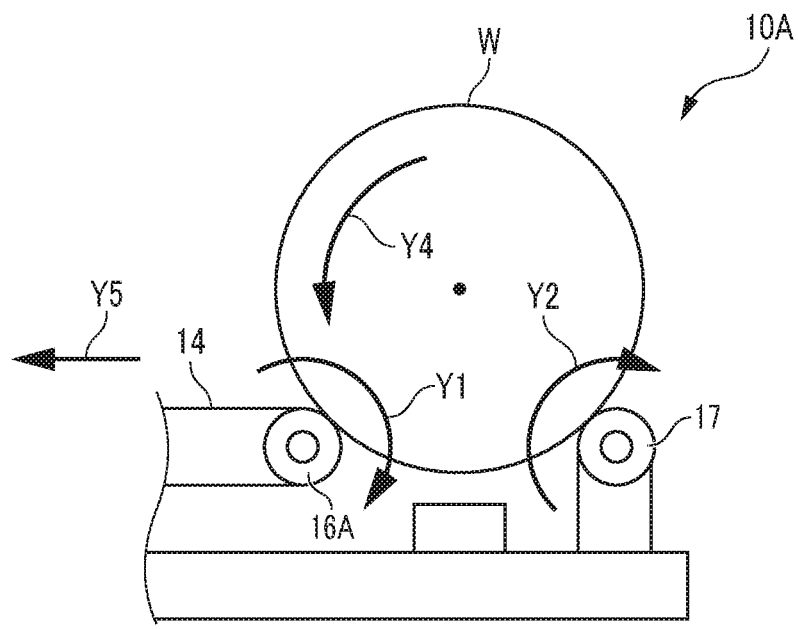
FIG. 21 is a diagram illustrating one example of an operation state in a case where the second roller returns forward when the driving wheel is vibrated in the vibrator of the modification example.

Instead of the vibrator 10 of the first embodiment, the vibrator 10A illustrated in FIGS. 20 and 21 may be used. In a case of this vibrator 10A, compared to the vibrator 10 of the first embodiment, only the point is different that the vibrator 10A includes a second roller 16A illustrated in FIGS. 20 and 21 instead of the second roller 16.

This second roller 16A is different only in the following point compared to the above-described second roller 16. That is, in a case of the second roller 16, the rotation center of the second roller 16 is positioned slightly above the central axis line of the vibrating shaft 14. However, this second roller 16A is configured such that the rotation center of the second roller 16A is positioned in the same plane as the central axis line of the vibrating shaft 14.

In a case where such a vibrator 10A is used, as illustrated in FIGS. 20 and 21, the second roller 16A rotates in the same manner as the second roller 16 during a vibrating operation. Accordingly, similar work and effects to a case where the vibrator 10 of the first embodiment is used can be obtained.

REFERENCE SIGNS LIST

1 vibrating device
10 vibrator
12 vibrating actuator
16 second roller
170 rotating actuator
17 first roller
V vehicle
W wheel, driving wheel
10A vibrator
16A second roller

What is claimed is:

1. A vibrating device vibrating a wheel of a vehicle as a vibrating target, the vibrating device comprising:
    a first roller which abuts the wheel from one side of the wheel of the vehicle in a front-rear direction, is arranged to regulate movement of the wheel to the one side in the front-rear direction, and is rotatable around an axis line along a rotation axis of the wheel;
    a second roller which is arranged to be capable of moving in the front-rear direction of the wheel, abuts the wheel from another side of the wheel in the front-rear direction and which is rotatable around an axis line along the rotation axis of the wheel;
    a vibrating actuator which vibrates the wheel via the second roller simultaneously in the front-rear direction and an up-down direction by driving the second roller in the front-rear direction of the wheel; and
    a rotating actuator which is capable of driving the second roller in a predetermined rotation direction,
    wherein the second roller is driven in the front-rear direction by the vibrating actuator while the second roller is driven to rotate by the rotating actuator.

2. The vibrating device according to claim 1, wherein the wheel is a driving wheel of the vehicle,
    the vibrating actuator drives the second roller such that the second roller moves in a first direction pressing the driving wheel and in a second direction away from the driving wheel, and
    the rotating actuator rotates the second roller such that the predetermined rotation direction of the second roller becomes a reverse direction to a rotation direction of the driving wheel when the second roller moved in the first direction and the second direction.

3. The vibrating device according to claim 2, wherein the second roller is driven such that a rotation speed ratio between the driving wheel and the second roller becomes a value within a predetermined range including a reciprocal value of a radius ratio between the driving wheel and the second roller.

\* \* \* \* \*